United States Patent
Gerber et al.

(10) Patent No.: US 9,869,478 B2
(45) Date of Patent: *Jan. 16, 2018

(54) VARIABLE DESICCANT CONTROL ENERGY EXCHANGE SYSTEM AND METHOD

(71) Applicant: Nortek Air Solutions Canada, Inc, Saskatoon (CA)

(72) Inventors: Manfred Gerber, Saskatoon (CA); Philip Paul LePoudre, Saskatoon (CA); Maury Brad Wawryk, Saskatoon (CA)

(73) Assignee: Nortek Air Solutions Canada, Inc., Saskatoon (CA)

( * ) Notice: Subject to any disclaimer, the term of this patent is extended or adjusted under 35 U.S.C. 154(b) by 0 days.

This patent is subject to a terminal disclaimer.

(21) Appl. No.: 14/804,953

(22) Filed: Jul. 21, 2015

(65) Prior Publication Data

US 2015/0323203 A1 Nov. 12, 2015

Related U.S. Application Data

(63) Continuation of application No. 13/801,280, filed on Mar. 13, 2013, now Pat. No. 9,109,808.

(51) Int. Cl.
  *F24F 5/00* (2006.01)
  *F24F 3/14* (2006.01)
  (Continued)

(52) U.S. Cl.
  CPC ............. *F24F 5/0014* (2013.01); *F24F 3/06* (2013.01); *F24F 3/1417* (2013.01);
  (Continued)

(58) Field of Classification Search
  CPC ........ F24F 3/1417; F24F 3/147; F24F 12/001; F24F 12/006; F24F 2003/1435;
  (Continued)

(56) References Cited

U.S. PATENT DOCUMENTS

| 1,015,831 A | 1/1912 | Pielock et al. |
| 2,186,844 A | 1/1940 | Smith |

(Continued)

FOREIGN PATENT DOCUMENTS

| AU | 2011286700 A1 | 12/2012 |
| CA | 2283089 A1 | 11/2000 |

(Continued)

OTHER PUBLICATIONS

"Aaonaire Energy Recovery Units Users Information Manual", (Aug. 2006), 16 pgs.

(Continued)

*Primary Examiner* — Mohammad M Ali
(74) *Attorney, Agent, or Firm* — Schwegman Lundberg & Woessner, P.A.

(57) ABSTRACT

Embodiments of the present disclosure provide a system and method for providing conditioned air to at least one enclosed structure. The system may include at least one conditioning module configured to provide conditioned air to the at least one enclosed structure. The conditioning module(s) may include a conditioning energy exchanger. The conditioning module(s) is configured to circulate desiccant through a desiccant circuit to condition air passing through the conditioning energy exchanger. The conditioning module(s) may be configured to receive at least one of concentrated desiccant or diluted desiccant in order to vary temperature or concentration of the desiccant circulating through the desiccant circuit.

20 Claims, 6 Drawing Sheets

(51) Int. Cl.
*F24F 3/06* (2006.01)
*F24F 11/00* (2006.01)

(52) U.S. Cl.
CPC ........ *F24F 11/008* (2013.01); *F24F 11/0012* (2013.01); *F24F 11/0015* (2013.01); *F24F 2003/1435* (2013.01); *F24F 2003/1458* (2013.01); *F24F 2011/0082* (2013.01)

(58) Field of Classification Search
CPC .......... F24F 11/008; F24F 5/0014; F24F 3/06; F24F 11/0012; F24F 11/0015; F24F 2003/1458; F24F 2011/00824; F24F 2011/0082; F28D 21/0015; F28D 15/00
USPC ............................................. 62/92, 94, 271
See application file for complete search history.

(56) References Cited

U.S. PATENT DOCUMENTS

| | | |
|---|---|---|
| 2,290,465 A | 7/1942 | Crawford et al. |
| 2,562,811 A | 7/1951 | Glenn |
| 2,946,201 A | 7/1960 | Munters |
| 2,968,165 A | 11/1961 | Gunnar |
| 3,009,684 A | 11/1961 | Georg |
| 3,018,231 A | 1/1962 | Valentine et al. |
| 3,247,679 A | 4/1966 | Gershon |
| 3,291,206 A | 12/1966 | Peter |
| 3,401,530 A | 9/1968 | Gershon |
| 3,467,072 A | 9/1969 | Toesca |
| 3,735,559 A | 5/1973 | Salemme |
| 4,113,004 A | 9/1978 | Rush et al. |
| 4,180,985 A | 1/1980 | Northrup, Jr. |
| 4,233,796 A | 11/1980 | Mazzoni et al. |
| 4,235,081 A | 11/1980 | Dowling |
| 4,257,169 A | 3/1981 | Pierce |
| 4,474,021 A | 10/1984 | Harband |
| 4,538,426 A | 9/1985 | Bock |
| 4,594,860 A | 6/1986 | Coellner et al. |
| 4,719,761 A | 1/1988 | Cromer |
| 4,729,428 A | 3/1988 | Yasutake et al. |
| 4,729,774 A | 3/1988 | Cohen et al. |
| 4,841,733 A | 6/1989 | Dussault et al. |
| 4,887,438 A | 12/1989 | Meckler |
| 4,905,479 A | 3/1990 | Wilkinson |
| 4,909,810 A | 3/1990 | Nakao et al. |
| 4,936,107 A | 6/1990 | Kitagaki et al. |
| 4,941,324 A | 7/1990 | Peterson et al. |
| 4,982,575 A | 1/1991 | Besik |
| 5,003,961 A | 4/1991 | Besik |
| 5,020,334 A | 6/1991 | Wilkinson |
| 5,022,241 A | 6/1991 | Wilkinson |
| 5,120,445 A | 6/1992 | Colman |
| 5,148,374 A | 9/1992 | Coellner |
| 5,170,633 A | 12/1992 | Kaplan |
| 5,176,005 A | 1/1993 | Kaplan |
| 5,181,387 A | 1/1993 | Meckler |
| 5,191,771 A | 3/1993 | Meckler |
| 5,297,398 A | 3/1994 | Meckler |
| 5,311,929 A | 5/1994 | Verret |
| 5,325,676 A | 7/1994 | Meckler |
| 5,337,574 A | 8/1994 | Dick |
| 5,351,497 A | 10/1994 | Lowenstein |
| 5,353,606 A | 10/1994 | Yoho et al. |
| 5,373,704 A | 12/1994 | Mcfadden |
| 5,387,376 A | 2/1995 | Gasser |
| 5,448,895 A | 9/1995 | Coellner et al. |
| 5,471,852 A | 12/1995 | Meckler |
| 5,482,625 A | 1/1996 | Shimizu et al. |
| 5,496,397 A | 3/1996 | Fischer et al. |
| 5,502,975 A | 4/1996 | Brickley et al. |
| 5,517,828 A | 5/1996 | Calton et al. |
| 5,526,651 A | 6/1996 | Worek et al. |
| 5,542,968 A | 8/1996 | Belding et al. |
| 5,551,245 A | 9/1996 | Calton et al. |
| 5,564,281 A | 10/1996 | Calton et al. |
| 5,579,647 A | 12/1996 | Calton et al. |
| 5,580,369 A | 12/1996 | Belding et al. |
| 5,632,954 A | 5/1997 | Coellner et al. |
| 5,638,900 A | 6/1997 | Lowenstein et al. |
| 5,649,428 A | 7/1997 | Calton et al. |
| 5,650,221 A | 7/1997 | Belding et al. |
| 5,660,048 A | 8/1997 | Belding et al. |
| 5,685,897 A | 11/1997 | Belding et al. |
| 5,701,762 A | 12/1997 | Akamatsu et al. |
| 5,718,286 A | 2/1998 | Damsohn et al. |
| 5,727,394 A | 3/1998 | Belding et al. |
| 5,749,230 A | 5/1998 | Coellner et al. |
| 5,758,508 A | 6/1998 | Belding et al. |
| 5,758,511 A | 6/1998 | Yoho et al. |
| 5,761,915 A | 6/1998 | Rao |
| 5,761,923 A | 6/1998 | Maeda |
| 5,791,153 A | 8/1998 | Belding et al. |
| 5,791,157 A | 8/1998 | Maeda |
| 5,816,065 A | 10/1998 | Maeda |
| 5,825,641 A | 10/1998 | Mangtani |
| 5,826,434 A | 10/1998 | Belding et al. |
| 5,832,736 A | 11/1998 | Yoshioka et al. |
| 5,860,284 A | 1/1999 | Goland et al. |
| 5,890,372 A | 4/1999 | Belding et al. |
| 5,911,273 A | 6/1999 | Brenner et al. |
| 5,931,016 A | 8/1999 | Yoho |
| 5,943,874 A | 8/1999 | Maeda |
| 5,946,931 A | 9/1999 | Lomax et al. |
| 5,992,160 A | 11/1999 | Bussjager et al. |
| 6,003,327 A | 12/1999 | Belding et al. |
| 6,018,953 A | 2/2000 | Belding et al. |
| 6,029,462 A | 2/2000 | Denniston |
| 6,029,467 A | 2/2000 | Moratalla |
| 6,050,100 A | 4/2000 | Belding et al. |
| 6,079,481 A | 6/2000 | Lowenstein et al. |
| 6,094,835 A | 8/2000 | Cromer |
| 6,138,470 A * | 10/2000 | Potnis ................. B01D 53/263 165/154 |
| 6,141,979 A | 11/2000 | Dunlap |
| 6,145,588 A | 11/2000 | Martin et al. |
| 6,176,101 B1 | 1/2001 | Lowenstein |
| 6,178,762 B1 | 1/2001 | Flax |
| 6,199,388 B1 | 3/2001 | Fischer |
| 6,199,392 B1 | 3/2001 | Maeda |
| 6,237,354 B1 | 5/2001 | Cromer |
| 6,269,650 B1 | 8/2001 | Shaw |
| 6,318,106 B1 | 11/2001 | Maeda |
| RE37,464 E | 12/2001 | Meckler |
| 6,363,218 B1 | 3/2002 | Lowenstein et al. |
| 6,412,295 B2 | 7/2002 | Weiss et al. |
| 6,442,951 B1 | 9/2002 | Maeda et al. |
| 6,494,053 B1 | 12/2002 | Forkosh |
| 6,497,107 B2 | 12/2002 | Maisotsenko et al. |
| 6,532,763 B1 | 3/2003 | Gupte |
| 6,546,746 B2 | 4/2003 | Forkosh et al. |
| 6,568,466 B2 | 5/2003 | Lowenstein et al. |
| 6,575,228 B1 | 6/2003 | Ragland et al. |
| 6,598,862 B2 | 7/2003 | Merrill et al. |
| 6,635,104 B2 | 10/2003 | Komkova et al. |
| 6,644,059 B2 | 11/2003 | Maeda et al. |
| 6,684,649 B1 | 2/2004 | Thompson |
| 6,709,492 B1 | 3/2004 | Spadaccini et al. |
| 6,720,990 B1 | 4/2004 | Walker et al. |
| 6,739,142 B2 | 5/2004 | Korin |
| 6,745,826 B2 | 6/2004 | Lowenstein et al. |
| 6,751,964 B2 | 6/2004 | Fischer |
| 6,841,601 B2 | 1/2005 | Serpico et al. |
| 6,848,265 B2 | 2/2005 | Lowenstein et al. |
| 6,854,278 B2 * | 2/2005 | Maisotsenko .......... F24F 3/1411 62/259.4 |
| 6,864,005 B2 | 3/2005 | Mossman |
| 6,935,416 B1 | 8/2005 | Tsunoda et al. |
| 6,973,795 B1 | 12/2005 | Moffitt |
| 6,976,365 B2 | 12/2005 | Forkosh et al. |
| 6,978,633 B2 | 12/2005 | Yamazaki |
| 7,000,427 B2 | 2/2006 | Mathias et al. |
| 7,017,356 B2 | 3/2006 | Moffitt |
| 7,092,006 B2 | 8/2006 | Walker et al. |

(56) References Cited

U.S. PATENT DOCUMENTS

| | | |
|---|---|---|
| 7,093,452 B2 | 8/2006 | Chee et al. |
| 7,093,649 B2 | 8/2006 | Dawson |
| RE39,288 E | 9/2006 | Assaf |
| 7,178,355 B2 | 2/2007 | Moffitt |
| 7,181,918 B2 * | 2/2007 | Reinders ............ B60H 1/00364 62/121 |
| 7,231,967 B2 | 6/2007 | Haglid |
| 7,269,966 B2 | 9/2007 | Lowenstein et al. |
| 7,306,650 B2 | 12/2007 | Slayzak et al. |
| 7,331,376 B2 | 2/2008 | Gagnon et al. |
| 7,340,906 B2 | 3/2008 | Moffitt |
| 7,389,646 B2 | 6/2008 | Moffitt |
| 7,389,652 B1 | 6/2008 | Fair |
| 7,593,033 B2 | 9/2009 | Walker et al. |
| 7,602,414 B2 | 10/2009 | Walker et al. |
| 7,605,840 B2 | 10/2009 | Walker et al. |
| 7,717,404 B2 | 5/2010 | Hasegawa et al. |
| 7,719,565 B2 | 5/2010 | Walker et al. |
| 7,737,224 B2 | 6/2010 | Willis et al. |
| 7,753,991 B2 | 7/2010 | Kertzman |
| 7,781,034 B2 | 8/2010 | Yializis et al. |
| 7,817,182 B2 | 10/2010 | Walker et al. |
| D638,925 S | 5/2011 | Charlebois et al. |
| 7,942,387 B2 | 5/2011 | Forkosh |
| 7,966,841 B2 | 6/2011 | Lowenstein et al. |
| 8,002,023 B2 | 8/2011 | Murayama |
| 8,033,532 B2 | 10/2011 | Yabu |
| 8,137,436 B2 | 3/2012 | Calis et al. |
| 8,157,891 B2 | 4/2012 | Montie et al. |
| 8,318,824 B2 | 11/2012 | Matsuoka et al. |
| 8,550,151 B2 | 10/2013 | Murayama et al. |
| 8,769,971 B2 | 7/2014 | Kozubal et al. |
| 8,783,053 B2 | 7/2014 | McCann |
| 8,887,523 B2 | 11/2014 | Gommed et al. |
| 8,915,092 B2 | 12/2014 | Gerber et al. |
| 8,920,699 B2 | 12/2014 | Marutani et al. |
| 8,943,848 B2 | 2/2015 | Phannavong et al. |
| 8,966,924 B2 | 3/2015 | Pichai |
| 9,027,764 B2 | 5/2015 | Murutani et al. |
| 9,109,808 B2 | 8/2015 | Gerber et al. |
| 9,188,349 B2 | 11/2015 | Warmerdam et al. |
| 9,234,665 B2 | 1/2016 | Erb et al. |
| 9,243,810 B2 | 1/2016 | Vandermeulen et al. |
| 9,273,877 B2 | 3/2016 | Vandermeulen |
| 9,429,332 B2 | 8/2016 | Vandermeulen et al. |
| 2001/0003902 A1 | 6/2001 | Kopko |
| 2002/0005271 A1 | 1/2002 | Weiss et al. |
| 2002/0038552 A1 | 4/2002 | Maisotsenko |
| 2003/0014983 A1 | 1/2003 | Maisotsenko et al. |
| 2003/0037905 A1 | 2/2003 | Weng |
| 2003/0070787 A1 | 4/2003 | Moffitt |
| 2003/0121271 A1 | 7/2003 | Dinnage et al. |
| 2004/0000152 A1 | 1/2004 | Fischer |
| 2004/0061245 A1 | 4/2004 | Maisotsenko et al. |
| 2004/0134211 A1 | 7/2004 | Lee et al. |
| 2004/0134212 A1 | 7/2004 | Lee et al. |
| 2004/0168462 A1 | 9/2004 | Assaf |
| 2004/0226685 A1 | 11/2004 | Gagnon et al. |
| 2005/0056042 A1 | 3/2005 | Bourne et al. |
| 2005/0072303 A1 | 4/2005 | Weidenmann |
| 2005/0230080 A1 | 10/2005 | Paul et al. |
| 2005/0249901 A1 | 11/2005 | Yializis et al. |
| 2005/0262862 A1 | 12/2005 | Moffitt |
| 2006/0021615 A1 | 2/2006 | Kertzman |
| 2006/0042295 A1 | 3/2006 | Assaf |
| 2006/0205301 A1 | 9/2006 | Klare et al. |
| 2007/0029685 A1 | 2/2007 | Lin |
| 2007/0056894 A1 | 3/2007 | Connors, Jr. |
| 2007/0095519 A1 | 5/2007 | Hombucher |
| 2007/0234743 A1 | 10/2007 | Assaf |
| 2007/0279861 A1 | 12/2007 | Doll et al. |
| 2008/0023182 A1 | 1/2008 | Beamer et al. |
| 2008/0085437 A1 | 4/2008 | Dean et al. |
| 2008/0099184 A1 | 5/2008 | Han |
| 2008/0283217 A1 | 11/2008 | Gagnon et al. |
| 2009/0095162 A1 | 4/2009 | Hargis et al. |
| 2009/0126913 A1 | 5/2009 | Lee et al. |
| 2009/0133866 A1 | 5/2009 | Campbell et al. |
| 2009/0193974 A1 | 8/2009 | Montie et al. |
| 2009/0294110 A1 | 12/2009 | Foust |
| 2009/0324929 A1 | 12/2009 | Yamakawa et al. |
| 2010/0090356 A1 | 4/2010 | Sines et al. |
| 2010/0170655 A1 | 7/2010 | Kronvall et al. |
| 2010/0170776 A1 | 7/2010 | Ehrenberg et al. |
| 2010/0192605 A1 | 8/2010 | Fang et al. |
| 2010/0200068 A1 | 8/2010 | D'arcy et al. |
| 2010/0275629 A1 | 11/2010 | Erickson |
| 2010/0300123 A1 | 12/2010 | Park et al. |
| 2010/0319370 A1 | 12/2010 | Kozubal et al. |
| 2011/0056384 A1 | 3/2011 | Kadota |
| 2011/0192579 A1 | 8/2011 | Sotokawa et al. |
| 2011/0223486 A1 | 9/2011 | Zhang et al. |
| 2011/0232485 A1 | 9/2011 | Ellsworth |
| 2011/0232633 A1 | 9/2011 | Lima |
| 2011/0308265 A1 | 12/2011 | Phannavong et al. |
| 2012/0061045 A1 | 3/2012 | Huizing |
| 2012/0085112 A1 | 4/2012 | Wintemute |
| 2012/0106073 A1 | 5/2012 | Wu et al. |
| 2012/0125020 A1 | 5/2012 | Vandermeulen et al. |
| 2012/0125021 A1 | 5/2012 | Vandermeulen et al. |
| 2012/0125023 A1 | 5/2012 | Kopko et al. |
| 2012/0125031 A1 | 5/2012 | Vandermeulen et al. |
| 2012/0125405 A1 | 5/2012 | Vandermeulen et al. |
| 2012/0125581 A1 | 5/2012 | Allen et al. |
| 2012/0131934 A1 | 5/2012 | Vandermeulen et al. |
| 2012/0131937 A1 | 5/2012 | Vandermeulen et al. |
| 2012/0131938 A1 | 5/2012 | Vandermeulen et al. |
| 2012/0131939 A1 | 5/2012 | Vandermeulen et al. |
| 2012/0131940 A1 | 5/2012 | Vandermeulen et al. |
| 2012/0132513 A1 | 5/2012 | Vandermeulen et al. |
| 2012/0162918 A1 | 6/2012 | Thyni et al. |
| 2012/0168369 A1 | 7/2012 | Van Medevoort et al. |
| 2012/0180505 A1 | 7/2012 | Gerber et al. |
| 2012/0186281 A1 | 7/2012 | Vandermeulen et al. |
| 2012/0247132 A1 | 10/2012 | Lakdawala et al. |
| 2012/0298340 A1 | 11/2012 | Al-Otaibi |
| 2013/0056177 A1 | 3/2013 | Coutu et al. |
| 2013/0186121 A1 | 7/2013 | Erb et al. |
| 2013/0199220 A1 | 8/2013 | Ma et al. |
| 2013/0240438 A1 | 9/2013 | Willis et al. |
| 2013/0248147 A1 | 9/2013 | Wintemute et al. |
| 2013/0340449 A1 | 12/2013 | Kozubal et al. |
| 2014/0054004 A1 | 2/2014 | LePoudre et al. |
| 2014/0054013 A1 | 2/2014 | Lepoudre et al. |
| 2014/0190037 A1 | 7/2014 | Erb et al. |
| 2014/0245769 A1 | 9/2014 | Vandermeulen et al. |
| 2014/0260367 A1 | 9/2014 | Coutu et al. |
| 2014/0260369 A1 | 9/2014 | Lepoudre et al. |
| 2014/0260399 A1 | 9/2014 | Vandermeulen |
| 2014/0262125 A1 | 9/2014 | Erb et al. |
| 2014/0262144 A1 | 9/2014 | Erb et al. |
| 2014/0326433 A1 | 11/2014 | Kozubal |
| 2015/0096714 A1 | 4/2015 | Dagley |
| 2015/0184876 A1 | 7/2015 | Vandermeulen et al. |
| 2015/0292754 A1 | 10/2015 | Mongar |
| 2016/0054012 A1 | 2/2016 | Lepoudre et al. |
| 2016/0084512 A1 | 3/2016 | Erb et al. |
| 2016/0187010 A1 | 6/2016 | Vandermeulen |
| 2016/0290666 A1 | 10/2016 | Coutu et al. |
| 2016/0298865 A1 | 10/2016 | Gerber et al. |
| 2016/0327345 A1 | 11/2016 | Lowenstein |

FOREIGN PATENT DOCUMENTS

| | | |
|---|---|---|
| CA | 2801352 A1 | 12/2011 |
| CA | 2798928 A1 | 2/2012 |
| CH | 193732 A | 10/1937 |
| CN | 1163389 A | 10/1997 |
| CN | 1343292 A | 4/2002 |
| CN | 1456855 A | 11/2003 |
| CN | 1517610 A | 8/2004 |
| CN | 1518477 A | 8/2004 |
| CN | 1666081 A | 9/2005 |
| CN | 1711448 A | 12/2005 |

(56) References Cited

FOREIGN PATENT DOCUMENTS

| | | |
|---|---|---|
| CN | 200958820 Y | 10/2007 |
| CN | 101405559 A | 4/2009 |
| CN | 101421580 A | 4/2009 |
| CN | 101469090 A | 7/2009 |
| CN | 101918777 A | 12/2010 |
| CN | 201906567 U | 7/2011 |
| CN | 102165268 A | 8/2011 |
| CN | 102232015 A | 11/2011 |
| CN | 102345909 A | 2/2012 |
| CN | 102395419 A | 3/2012 |
| CN | 102548727 A | 7/2012 |
| CN | 102549361 A | 7/2012 |
| CN | 102933931 A | 2/2013 |
| CN | 103069246 A | 4/2013 |
| CN | 103827595 A | 5/2014 |
| CN | 104583706 A | 4/2015 |
| CN | 105121989 A | 12/2015 |
| CN | 105164474 A | 12/2015 |
| CN | 105202795 A | 12/2015 |
| CN | 105283715 A | 1/2016 |
| CN | 101512238 A | 8/2016 |
| DE | 10143092 A1 | 3/2003 |
| EP | 0448991 A2 | 10/1991 |
| EP | 0661502 A2 | 7/1995 |
| EP | 1108575 A1 | 6/2001 |
| EP | 2397787 A2 | 12/2011 |
| FR | 2291457 A1 | 6/1976 |
| GB | 1354502 A | 6/1974 |
| GB | 2015384 A | 9/1979 |
| JP | 6152594 A | 3/1986 |
| JP | 05-157282 A | 6/1993 |
| JP | 09-196482 A | 7/1997 |
| JP | 10170177 A | 6/1998 |
| JP | 2004116419 A | 4/2004 |
| JP | 2004257588 A | 9/2004 |
| JP | 2008070046 A | 3/2008 |
| JP | 2009275955 A | 11/2009 |
| TW | I271499 B | 1/2007 |
| WO | WO-96/41107 A1 | 12/1996 |
| WO | WO-99/14535 A1 | 3/1999 |
| WO | WO-01/35039 A1 | 5/2001 |
| WO | WO-0171260 A1 | 9/2001 |
| WO | WO-03049835 A1 | 6/2003 |
| WO | WO-2004065875 A1 | 8/2004 |
| WO | WO-2008037079 A1 | 4/2008 |
| WO | WO-2008/053367 A2 | 5/2008 |
| WO | WO-2008089484 A1 | 7/2008 |
| WO | WO-2009000974 A1 | 12/2008 |
| WO | WO-2009094032 A1 | 7/2009 |
| WO | WO-2009158030 A1 | 12/2009 |
| WO | WO-2011062808 A1 | 5/2011 |
| WO | WO-2011/161547 A3 | 12/2011 |
| WO | WO-2011161547 A2 | 12/2011 |
| WO | WO-2012018089 A1 | 2/2012 |
| WO | WO-2012042553 A1 | 4/2012 |
| WO | WO-2012087273 A1 | 6/2012 |
| WO | WO-2012097445 A1 | 7/2012 |
| WO | WO-2012167366 A1 | 12/2012 |
| WO | WO-2013029148 A1 | 3/2013 |
| WO | WO-2013094206 A1 | 6/2013 |
| WO | WO-2013107554 A1 | 7/2013 |
| WO | WO-2013192397 A1 | 12/2013 |
| WO | WO-2014029003 A1 | 2/2014 |
| WO | WO-2014029004 A1 | 2/2014 |
| WO | WO-2014107790 A1 | 7/2014 |
| WO | WO-2014138846 A1 | 9/2014 |
| WO | WO 2014138847 A1 | 9/2014 |
| WO | WO-2014138859 A1 | 9/2014 |
| WO | WO-2014138860 | 9/2014 |
| WO | WO-2016026042 A1 | 2/2016 |
| WO | WO-2016183667 A1 | 11/2016 |
| WO | WO-2016207864 A1 | 12/2016 |

OTHER PUBLICATIONS

"Advances in Desiccant-Based Dehumidification", TRANE Engineers Newsletter; vol. 34-4, 1-8.
"U.S. Appl. No. 13/801,280, 312 Amendment, filed Jun. 18, 2015", 8 pgs.
"U.S. Appl. No. 13/801,280, Non Final Office Action mailed Feb. 12, 2015", 7 pgs.
"U.S. Appl. No. 13/801,280, Notice of Allowance mailed May 19, 2015", 7 pgs.
"U.S. Appl. No. 13/801,280, PTO Response to 312 Amendment mailed Jul. 9, 2015", 2 pgs.
"U.S. Appl. No. 13/801,280, Response filed Jan. 7, 2015 to Restriction Requirement mailed Dec. 10, 2014", 1 pg.
"U.S. Appl. No. 13/801,280, Response filed Mar. 31, 2015 to Non Final Office Action mailed Feb. 12, 2015", 9 pgs.
"U.S. Appl. No. 13/801,280, Restriction Requirement mailed Dec. 10, 2014", 9 pgs.
"Ashrae Technical Committee", Meeting Programs, (Jan. 29, 1997), 13 pgs.
"Dehumidification Solutions", Des Champs Laboratories, Inc, (2001), 18 pgs.
"Desi-WringerTM Precision Desiccant Dehumidification Systems", Des Champs Technologies, (2007), 12 pgs.
"Energy Recovery—Fresh in Air Quality", Semco Inc., 131 pgs.
"Heating, Ventilating, and Air Conditioning (HVAC) Demonstration", Chapter 8—HVAC Demonstration, 16 pgs.
"International Application Serial No. PCT/CA2014/000048, International Search Report mailed Apr. 29, 2014", 3 pgs.
"International Application Serial No. PCT/CA2014/000048, Written Opinion mailed Apr. 29, 2014", 6 pgs.
"Two-Wheel Desiccant Dehumidification System—Technology for Dehumidification and Improving Indoor Air Quality", Federal Technology Alert, (Apr. 1997), 24 pgs.
Acker, "Industrial Dehumidification: Water Vapor Load Calculations and System Descriptions", *HPAC Heating/Pioina/Air Conditioning*, (Mar. 1999), 49-59.
Bellia et al., "Air Conditioning Systems With Desiccant Wheel for Italian Climates", *International Journal on Architectural Science* vol. 1 No. 4, (2000), 193-213.
Bergero, Stefano, et al., "Performance analysis of a liquid desiccant and membrane contactor hybrid air-conditioning system", *Bergero, Chiari, Energy and Buildings*, (2010), 11 pgs.
Chant, et al., "A Steady-State Simulation of an Advanced Desiccant-Enhanced Cooling and Dehumidification System", *ASHRAE Transactions: Research*, (Jul. 1992), 339-347.
Coad, William J., "Conditioning Ventilation Air for Improved Performance and Air Quality", *HPAC Heating/Piping/Air Conditioning*, (Sep. 1999), 6 pgs.
DiBlasio, Robert, "Desicants in Hospitals—Conditioning a Research Facility", *DiBlasio Engineered Sytems*, (Sep. 1995), 4 pgs.
Downing, "Humidity Control—No Place Like Home", Engineered Systems, (1996), 4 pgs.
Downing, et al., "Operation and Maintenance for Quality Indoor Air", Proceedings of the *7th Symposium on Improving Building Systems in Hot and Humid Climates*, Ft. Worth, TX, (Oct. 9, 1990), 5 pgs.
Fischer, "Active Desiccant Dehumidification Module Integration With Rooftop Packaged HVAC Units—Final Report Phase 3B", Oak Ridge National Laboratory, (Mar. 2002), 36 pgs.
Fischer, "Optimizing IAQ, Humidity Control, and Energy Efficiency in School Environments Through the Application of Desiccant-Based Total Energy Recovery Systems", *IAQ 96/Paths to Better Building Environments/Environmental Effects on Health and Productivity*; (1996), 179-194.
Harriman, III, et al., "Dehumidification and Cooling Loads From Ventilation Air", *ASHRAE Journal*, (Nov. 1997), 7 pgs.
Harriman, III, et al., "Evaluating Active Desiccant Systems for Ventilating Commercial Buildings", *ASHRAE Journal*, (Oct. 1999), 7 pgs.
Harriman, III, et al., "New Weather Data for Energy Calculations", *ASHRAE Journal*, (Mar. 1999), 7 pgs.

(56) References Cited

OTHER PUBLICATIONS

Jeong, et al., "Energy Conservation Benefits of a Dedicated Outdoor Air System with Parallel Sensible Cooling by Ceiling Radiant Panels", *ASHRAE Transactions*; vol. 109 Part 2, (2003), 10 pgs.

Kosar, et al., "Dehumidification Issues of Standard 62-1989", *ASHARE Journal*, (Mar. 1988), 71-75.

McGahey, Kevin, et al., "Desiccants: Benefits for the Second Century of Air Conditioning", *Proceedings of the Tenth Symposium on Improving Building Systems in Hot and Humid Climates*, Ft. Worth, Texas, (May 14, 1996), 9 pgs.

McGahey, Kevin, "New Commercial Applications for Desiccant-Based Cooling", *ASHARE Journal*, (Jul. 1998), 41-45.

Mumma, S. A., et al., "Achieving Dry Outside Air in an Energy-Efficient Manner", ASHRAE Transactions 2001; vol. 107: Part 1, (2001), 8 pgs.

Mumma, S. A., "Dedicated Outdoor Air-Dual Wheel System Control Requirements", *ASHRAE Transactions* 2001; vol. 107; Part 1, (2001), 9 pgs.

Mumma, S. A., et al., "Extension of the Multiple Spaces Concept of ASHRAE Standard 62 to Include Infiltration, Exhaust/Exfiltration, Interzonal Transfer, and Additional Short-Circuit Paths", *ASHRAE Transactions: Symposia*, (1998), 1232-1241.

Mumma, S. A., "Overview of Integrating Dedicated Outdoor Air Systems With Parallel Terminal Systems", *ASH RAE Transactions* vol. 107: Part 1, (2001), 7 pgs.

Nimmo, B. G., et al., "DEAC: Desiccant Enhancement of Cooling-Based Dehumidification", *ASHRAE Transactions: Symposia*, (1993), 842-848.

Qin, et al., "Engine-driven Desiccant-assisted Hybrid Air-conditioning System", *23rd World Gas Conference*, Amsterdam, (2006), 15 pgs.

Scofield, et al., "HVAC Design for Classrooms: Divide and Conquer", *Heating/Piping/Air Conditioning*, (May 1993), 53-59.

Sevigny, et al., "Air Handling Unit Direct Digital Control System Retrofit to Provide Acceptable Indoor Air Quality and Global Energy Optimization", *Engergy Engineering*, vol. 94, No. 5, (1997), 24-43.

Shank, et al., "Selecting the Supply Air Conditions for a Dedicated Outdoor Air System Working in Parallel with Distributed Sensible Cooling Terminal Equipment", *ASHRAE Transactions* vol. 107; Part 1, (2001), 10 pgs.

Smith, Christopher S., et al., "Outdoor Air, Heat Wheels and JC Penny: A New Approach to Retail Ventilation", Proceedings of the Eleventh Symposium on Improving Building Systems in Hot and Humid Climates, Ft. Worth, Texas, (Jun. 2, 1998), 1 pg.

Smith, James C., "Schools Resolve IAQ/Humidity Problems with Desiccant Preconditioning", Heating/Piping/Air Conditioning, (Apr. 1996), 6 pgs.

Swails, et al., "A Cure for Growing Pains", Consulting Specifying Engineer, [Online] retrieved from the internet:www.csermag.com, (Jun. 1997), 4 pgs.

Turpin, "Dehumidification: The Problem No One Wants to Talk About (Apr. 2000)", [Online] retrieved from the internet: http//www.esmagazine.com/copyrighVde12c1c879ba8010VgnVCM1 00000f932a8c0_?, (May 6, 2011), 6 pgs.

Woods, J, et al., "Desiccant Enhanced Evaporative Air Conditioning: Parametric Analysis and Design", Presented at the Second International Conference on Building Energy and Environment (COBEE2012), Conference Paper, (Oct. 2012), 10 pgs.

Yborra, "Field Evalutation of Desiccant-Integrated HVAC Systems: A Review of Case Studies in Multiple Commercial/Institutional Building Types", Proceedings of the Eleventh Symposium on Improving Building Systems in Hot and Humid Climates, Ft. Worth, Texas, (Jun. 2, 1998), 361-370.

U.S. Appl. No. 15/185,155, filed Jun. 17, 2016, Variable Desiccant Control Energy Exchange System and Method.

"AAONAIRE(r) Energy Recovery Units Users Information Manual", R86610 (Rev. A 8-06), (Aug. 2006), 16 pgs.

"U.S. Appl. No. 13/350,902, Appeal Brief filed Apr. 4, 2014", 24 pgs.

"U.S. Appl. No. 13/350,902, Appeal Decision dated Sep. 30, 2016", 6 pgs.

"U.S. Appl. No. 13/350,902, Examiner's Answer dated Jun. 16, 2014", 17 pgs.

"U.S. Appl. No. 13/350,902, Final Office Action dated Dec. 30, 2013", 13 pgs.

"U.S. Appl. No. 13/350,902, Non Final Office Action dated Oct. 1, 2013", 13 pgs.

"U.S. Appl. No. 13/350,902, Notice of Allowance dated Nov. 9, 2016", 9 pgs.

"U.S. Appl. No. 13/350,902, Reply Brief filed Jul. 8, 2014", 9 pgs.

"U.S. Appl. No. 13/350,902, Response filed Aug. 5, 2013 to Restriction Requirement dated Jul. 23, 2013", 2 pgs.

"U.S. Appl. No. 13/350,902, Response filed Oct. 29, 2013 to Non Final Office Action dated Oct. 1, 2013", 15 pgs.

"U.S. Appl. No. 13/350,902, Restriction Requirement dated Jul. 23, 2013", 8 pgs.

"U.S. Appl. No. 13/449,598, Final Office Action dated Feb. 4, 2016", 23 pgs.

"U.S. Appl. No. 13/449,598, Non Final Office Action dated Apr. 24, 2015", 18 pgs.

"U.S. Appl. No. 13/449,598, Non Final Office Action dated Aug. 27, 2015", 20 pgs.

"U.S. Appl. No. 13/449,598, Notice of Allowance dated Mar. 10, 2017", 7 pgs.

"U.S. Appl. No. 13/449,598, Notice of Allowance dated Nov. 4, 2016", 9 pgs.

"U.S. Appl. No. 13/449,598, Response filed Jan. 29, 2015 to Restriction Requirement dated Jan. 5, 2015", 2 pgs.

"U.S. Appl. No. 13/449,598, Response filed Jul. 17, 2015 to Non Final Office Action dated Apr. 24, 2015", 17 pgs.

"U.S. Appl. No. 13/449,598, Response filed Nov. 16, 2015 to Non Final Office Action dated Aug. 27, 2015", 18 pgs.

"U.S. Appl. No. 13/449,598, Restriction Requirement dated Jan. 5, 2015", 10 pgs.

"U.S. Appl. No. 13/702,596, Appeal Brief filed Jun. 15, 2015", 82 pgs.

"U.S. Appl. No. 13/702,596, Final Office Action dated Jan. 30, 2015", 15 pgs.

"U.S. Appl. No. 13/702,596, Non Final Office Action dated Oct. 30, 2014", 16 pgs "U.S. Appl. No. 13/702,596, Notice of Allowance dated Oct. 1, 2015", 7 pgs.

"U.S. Appl. No. 13/702,596, Notice of Allowance dated Nov. 25, 2015", 2 pgs.

"U.S. Appl. No. 13/702,596, Post Allowance Amendment filed Oct. 7, 2015", 13 pgs.

"U.S. Appl. No. 13/702,596, PTO Response to Rule 312 Communication dated Oct. 19, 2015", 2 pgs.

"U.S. Appl. No. 13/702,596, Response filed Dec. 15, 2014 to Non Final Office Action dated Oct. 30, 2014", 21 pgs.

"U.S. Appl. No. 13/797,062, Appeal Brief filed Jun. 9, 2016", 33 pgs.

"U.S. Appl. No. 13/797,062, Final Office Action dated Feb. 24, 2016", 29 pgs.

"U.S. Appl. No. 13/797,062, Non Final Office Action dated May 7, 2015", 19 pgs.

"U.S. Appl. No. 13/797,062, Non Final Office Action dated Aug. 25, 2015", 24 pgs.

"U.S. Appl. No. 13/797,062, Response filed Apr. 23, 2015 to Restriction Requirement dated Mar. 13, 2015", 3 pgs.

"U.S. Appl. No. 13/797,062, Response filed Jul. 17, 2015 to Non Final Office Action dated May 7, 2015", 16 pgs.

"U.S. Appl. No. 13/797,062, Response filed Nov. 30, 2015 to Non Final Office Action dated Sep. 25, 2015", 16 pgs.

"U.S. Appl. No. 13/797,062, Restriction Requirement dated Mar. 13, 2015", 8 pgs.

"U.S. Appl. No. 13/797,152, Appeal Brief filed Jun. 9, 2016", 29 pgs.

"U.S. Appl. No. 13/797,152, Corrected Notice of Allowance dated Mar. 9, 2017", 7 pgs.

"U.S. Appl. No. 13/797,152, Final Office Action dated Feb. 25, 2016", 14 pgs.

(56) References Cited

OTHER PUBLICATIONS

"U.S. Appl. No. 13/797,152, Non Final Office Action dated Aug. 25, 2015", 10 pgs.
"U.S. Appl. No. 13/797,152, Notice of Allowance dated Mar. 9, 2017", 7 pgs.
"U.S. Appl. No. 13/797,152, Notice of Allowance dated Oct. 31, 2016", 7 pgs.
"U.S. Appl. No. 13/797,152, Response filed Nov. 20, 2015 to Non Final Office Action dated Aug. 25, 2015", 12 pgs.
"U.S. Appl. No. 14/171,951, Advisory Action dated Nov. 10, 2016", 3 pgs.
"U.S. Appl. No. 14/171,951, Final Office Action dated Jun. 28, 2016", 36 pgs.
"U.S. Appl. No. 14/171,951, Non Final Office Action dated Jan. 5, 2016", 20 pgs.
"U.S. Appl. No. 14/171,951, Non Final Office Action dated May 2, 2016", 35 pgs.
"U.S. Appl. No. 14/171,951, Notice of Allowance dated Feb. 3, 2017", 5 pgs.
"U.S. Appl. No. 14/171,951, Response filed Mar. 28, 2016 to Non Final Office Action dated Jan. 5, 2016", 18 pgs.
"U.S. Appl. No. 14/171,951, Response filed Jun. 9, 2016 to Non Final Office Action dated May 2, 2016", 24 pgs.
"U.S. Appl. No. 14/171,951, Response filed Oct. 28, 2016 to Final Office Action dated Jun. 28, 2016", 15 pgs.
"U.S. Appl. No. 14/171,951, Response filed Dec. 3, 2015 to Restriction Requirement dated Nov. 16, 2015", 6 pgs.
"U.S. Appl. No. 14/171,951, Response filed Dec. 15, 2016 to Advisory Action dated Nov. 10, 2016", 16 pgs.
"U.S. Appl. No. 14/171,951, Restriction Requirement dated Nov. 16, 2015", 13 pgs.
"U.S. Appl. No. 14/186,420, Notice of Allowance dated Jan. 27, 2017", 7 pgs
"U.S. Appl. No. 14/187,413, Advisory Action dated Nov. 10, 2016", 4 pgs.
"U.S. Appl. No. 14/187,413, Final Office Action dated Jul. 28, 2016", 20 pgs.
"U.S. Appl. No. 14/187,413, Non Final Office Action dated Feb. 8, 2017", 15 pgs.
"U.S. Appl. No. 14/187,413, Non Final Office Action dated Mar. 17, 2016", 15 pgs.
"U.S. Appl. No. 14/187,413, Response filed Feb. 25, 2015 to Restriction Requirement dated Feb. 16, 2016", 3 pgs.
"U.S. Appl. No. 14/187,413, Response filed May 26, 2016 to Non Final Office Action dated Mar. 17, 2016", 15 pgs.
"U.S. Appl. No. 14/187,413, Response filed Oct. 28, 2016 to Final Office Action dated Jul. 28, 2016", 17 pgs.
"U.S. Appl. No. 14/187,413, Response filed Dec. 21, 2016 to Final Office Action dated Jul. 28, 2016 and Advisory Action dated Nov. 10, 2016", 15 pgs.
"U.S. Appl. No. 14/187,413, Restriction Requirement dated Feb. 16, 2016", 6 pgs.
"U.S. Appl. No. 14/190,715, Restriction Requirement dated Apr. 13, 2017", 7 pgs.
"Australian Application Serial No. 2011268661, First Examiner Report dated Sep. 24, 2014", 5 pgs.
"Australian Application Serial No. 2011268661, Response filed Jul. 20, 2015 to First Examiner Report dated Sep. 24, 2014", 8 pgs.
"Australian Application Serial No. 2011268661, Response filed Sep. 23, 2015 to Second Examiner Report dated Aug. 18, 2015", 5 pgs.
"Australian Application Serial No. 2011268661, Second Examiner Report dated Aug. 18, 2015", 6 pgs.
"Australian Application Serial No. 2012208921, First Examiner Report dated Jun. 2, 2016", 7 pgs.
"Australian Application Serial No. 2012304223, First Examiner Report dated Aug. 5, 2016", 4 pgs.
"Canadian Application Serial No. 2,801,352, Office Action dated Aug. 15, 2016", 3 pgs.
"Canadian Application Serial No. 2,843,763, Office Action dated Dec. 4, 2014", 3 pgs.
"Canadian Application Serial No. 2,843,763, Response filed May 12, 2015 to Office Action dated Dec. 4, 2014", 31 pgs.
"Canadian Application Serial No. 2,901,483, Office Action dated Nov. 23, 2016", 4 pgs.
"Chinese Application Serial No. 201280006006.9, Office Action dated Feb. 2, 2016", (w/ English Summary), 19 pgs.
"Chinese Application Serial No. 201280006006.9, Response filed Apr. 8, 2016 to Office Action dated Feb. 2, 2016", (w/ English Translation of Claims), 64 pgs.
"Chinese Application Serial No. 201280006006.9, Voluntary Amendment filed Apr. 14, 2014", 61 pgs.
"Chinese Application Serial No. 201180031103.9, Office Action dated Feb. 11, 2015", (w/ English Translation), 16 pgs.
"Chinese Application Serial No. 201180031103.9, Office Action dated Jun. 13, 2014", (With English Translation), 19 pgs.
"Chinese Application Serial No. 201180031103.9, Office Action dated Sep. 9, 2015", (w/ English Translation), 3 pgs.
"Chinese Application Serial No. 201180031103.9, Office Action dated Nov. 6, 2015", (w/ English Translation), 5 pgs.
"Chinese Application Serial No. 201180031103.9, Response filed Apr. 27, 2015 to Office Action dated Feb. 11, 2015", (w/ English Translation), 15 pgs.
"Chinese Application Serial No. 201180031103.9, Response filed Sep. 26, 2014 to Office Action dated Jun. 13, 2014", (w/ English Translation), 12 pgs
"Chinese Application Serial No. 201180031103.9, Response filed Sep. 29, 2015 to Office Action dated Sep. 9, 2015", (w/ English Translation), 78 pgs.
"Chinese Application Serial No. 201280006006.9, Office Action dated May 13, 2015", 3 pgs.
"Chinese Application Serial No. 201280006006.9, Office Action dated Aug. 15, 2016", (English Translation), 18 pgs.
"Chinese Application Serial No. 201280006006.9, Response filed Sep. 28, 2015 to Office Action dated May 13, 2015", (w/ English Translation of Claims), 71 pgs.
"Chinese Application Serial No. 201280006006.9, Response filed Dec. 30, 2016 to Office Action dated Aug. 15, 2016", (w/ English Translation of Claims), 69 pgs.
"Chinese Application Serial No. 201280042778.8, Office Action dated Feb. 3, 2016", (With English Translation), 9 pgs.
"Chinese Application Serial No. 201280042778.8, Office Action dated Sep. 7, 2016", 3 pgs.
"Chinese Application Serial No. 201280042778.8, Response filed May 25, 2016 to Office Action dated Feb. 3, 2016", Without English Translation of Claims, 46 pgs.
"Chinese Application Serial No. 201280042778.8, Response filed Nov. 16, 2016 to Office Action dated Sep. 7, 2016", Without English Translation of Claims, 43 pgs.
"Chinese Application Serial No. 201380042926.0, Office Action dated Feb. 26, 2016", (With English Translation), 15 pgs.
"Chinese Application Serial No. 201380042926.0, Office Action dated Sep. 28, 2016", (w/ English Translation), 12 pgs.
"Chinese Application Serial No. 201380042926.0, Response filed Jul. 7, 2016 to Office Action dated Feb. 26, 2016", (w/ English Translation of Claims), 40 pgs.
"Chinese Application Serial No. 201380044484.3, Office Action dated Jan. 13, 2017", (w/ English Translation), 16 pgs.
"Chinese Application Serial No. 201380044484.3, Office Action dated Mar. 28, 2016", (w/ English Translation), 16 pgs.
"Chinese Application Serial No. 201380044484.3, Response filed Oct. 12, 2016 to Office Action dated Mar. 28, 2016", (w/ English Translation of Claims), 54 pgs.
"Chinese Application Serial No. 201480015355.6, Office Action dated Nov. 28, 2016", (w/ English Translation), 16 pgs.
"Chinese Application Serial No. 201480015422.4, Office Action dated Nov. 1, 2016", (w/ English Translation), 13 pgs.
"Chinese Application Serial No. 201480015766.5, Office Action dated Oct. 19, 2016", (w/ English Translation), 9 pgs.
"European Application Serial No. 11797695.1, Extended European Search Report dated Jan. 25, 2016", 11 pgs.

(56) References Cited

OTHER PUBLICATIONS

"European Application Serial No. 11797695.1, Partial Supplementary European Search Report dated Oct. 7, 2015", 6 pgs.
"European Application Serial No. 11797695.1, Response filed Aug. 22, 2016 to Office Action dated Feb. 11, 2016", 9 pgs.
"European Application Serial No. 12736074.1, Extended European Search Report dated Jul. 13, 2015", 8 pgs.
"European Application Serial No. 12736074.1, Response filed Oct. 2, 2015 to Extended European Search Report dated Jul. 13, 2015", 10 pgs.
"European Application Serial No. 12827918.9, Extended European Search Report dated Jul. 6, 2015", 6 pgs.
"European Application Serial No. 12827918.9, Response filed Sep. 28, 2015 to Extended European Search Report dated Jul. 6, 2015", 8 pgs.
"European Application Serial No. 13830357.3, Extended European Search Report dated Jun. 8, 2016", 5 pgs.
"European Application Serial No. 13830357.3, Response filed Dec. 23, 2016 to Extended European Search Report dated Jun. 8, 2016", 11 pgs.
"European Application Serial No. 13830940.6, Extended European Search Report dated Jul. 4, 2016", 5 pgs.
"European Application Serial No. 13830940.6, Response filed Jan. 16, 2017 to Communication Pursuant to Rules 70(2) and 70a(2) EPC dated Jul. 21, 2016", 1 pg.
"European Application Serial No. 14764192.2, Extended European Search Report dated Oct. 27, 2016", 7 pgs.
"European Application Serial No. 14764192.2, Response filed Jan. 30, 2017 to Extended European Search Report dated Oct. 27, 2016", 19 pgs.
"European Application Serial No. 14764192.2, Response filed Apr. 13, 2016 to Communication Pursuant Rules 161(2) and 162 EPC dated Nov. 19, 2015", 9 pgs.
"European Application Serial No. 14764305.0, Response filed Apr. 13, 2016 to Communication Pursuant to Article 94(3) EPC dated Oct. 8, 2015", 10 pgs.
"European Application Serial No. 14764318.3, Extended European Search Report dated Mar. 15, 2017", 10 pgs.
"European Application Serial No. 14764318.3, Response filed Jan. 28, 2016 to Communication pursuant to Rules 161(1) and 162 EPC dated Nov. 19, 2015", 17 pgs.
"European Application Serial No. 14764713.5, Extended European Search Report dated Dec. 9, 2016", 6 pgs.
"European Application Serial No. 14764713.5, Response filed Jan. 28, 2016 to Communication pursuant to Rules 161(1) and 162 EPC dated Dec. 2, 2015", 9 pgs.
"European Application Serial No. 14765396.8, Extended European Search Report dated Oct. 28, 2016", 6 pgs.
"European Application Serial No. 14765396.8, Office Action dated Nov. 20, 2015", 2 pgs.
"European Application Serial No. 14765396.8, Response filed Jan. 29, 2016 to Office Action dated Nov. 20, 2015", 12 pgs.
"International Application Serial No. PCT/CA2012/000055, International Preliminary Report on Patentability dated Aug. 1, 2013", 9 pgs.
"International Application Serial No. PCT/CA2012/000055, International Search Report dated May 24, 2012", 4 pgs.
"International Application Serial No. PCT/CA2012/000055, Invitation to Pay Add'l Fees and Partial Search Report dated Mar. 23, 2012", 2 pgs.
"International Application Serial No. PCT/CA2012/000055, Written Opinion dated May 24, 2012", 7 pgs.
"International Application Serial No. PCT/CA2012/000749, International Search Report dated Oct. 26, 2012", 3 pgs.
"International Application Serial No. PCT/CA2012/000749, Written Opinion dated Oct. 26, 2012", 5 pgs.
"International Application Serial No. PCT/CA2013/000608, International Preliminary Report on Patentability dated Mar. 5, 2015", 7 pgs.
"International Application Serial No. PCT/CA2013/000608, International Search Report dated Sep. 23, 2013", 3 pgs.
"International Application Serial No. PCT/CA2013/000608, Written Opinion dated Sep. 23, 2013", 5 pgs.
"International Application Serial No. PCT/CA2013/000609, International Preliminary Report on Patentability dated Mar. 5, 2015", 7 pgs.
"International Application Serial No. PCT/CA2013/000609, International Search Report dated Sep. 17, 2013", 3 pgs.
"International Application Serial No. PCT/CA2013/000609, Written Opinion dated Sep. 17, 2013", 5 pgs.
"International Application Serial No. PCT/CA2014/000048, International Preliminary Report on Patentability dated Sep. 24, 2015", 8 pgs.
"International Application Serial No. PCT/CA2014/000083, International Preliminary Report on Patentability dated Sep. 24, 2015", 9 pgs.
"International Application Serial No. PCT/CA2014/000083, International Search Report dated May 14, 2014", 3 pgs.
"International Application Serial No. PCT/CA2014/000083, Written Opinion dated May 14, 2014", 7 pgs.
"International Application Serial No. PCT/CA2014/000148, International Preliminary Report on Patentability dated Sep. 24, 2015", 5 pgs.
"International Application Serial No. PCT/CA2014/000148, International Search Report dated May 9, 2014", 4 pgs.
"International Application Serial No. PCT/CA2014/000148, Written Opinion dated May 9, 2014", 3 pgs.
"International Application Serial No. PCT/CA2014/000169, International Preliminary Report on Patentability dated Sep. 24, 2015", 8 pgs.
"International Application Serial No. PCT/CA2014/000169, International Search Report dated May 27, 2014", 3 pgs.
"International Application Serial No. PCT/CA2014/000169, Written Opinion dated May 27, 2014", 6 pgs.
"International Application Serial No. PCT/CA2014/000171, International Preliminary Report on Patentability dated Sep. 24, 2015", 7 pgs.
"International Application Serial No. PCT/CA2014/000171, International Search Report dated May 27, 2014", 3 pgs.
"International Application Serial No. PCT/CA2014/000171, Written Opinion dated May 27, 2014", 5 pgs.
"International Application Serial No. PCT/CA2015/050787, International Search Report dated Nov. 4, 2015", 3 pgs.
"International Application Serial No. PCT/CA2015/050787, Written Opinion dated Nov. 4, 2015", 3 pgs.
"International Application Serial No. PCT/CA2016/050252, International Search Report dated May 26, 2016", 3 pgs.
"International Application Serial No. PCT/CA2016/050252, Written Opinion dated May 26, 2016", 4 pgs.
"International Application Serial No. PCT/CA2016/050507, International Search Report dated Jul. 21, 2016", 3 pgs.
"International Application Serial No. PCT/CA2016/050507, Written Opinion dated Jul. 21, 2016", 3 pgs.
"International Application Serial No. PCT/IB2011/002145, International Preliminary Report on Patentability dated Jan. 10, 2013", 13 pgs.
"International Application Serial No. PCT/IB2011/002145, International Search Report dated Feb. 15, 2012", 7 pgs.
"International Application Serial No. PCT/IB2011/002145, Written Opinion dated Feb. 15, 2012", 11 pgs.
"International Application Serial No. PCT/IB2016/053799, International Search Report dated Aug. 26, 2016", 3 pgs.
"International Application Serial No. PCT/IB2016/053799, Written Opinion dated Aug. 26, 2016", 6 pgs.
"Plane plate membrane contactor prototypes", University of Genoa, (Published prior to Mar. 28, 2013), 1 pg.
Abdel-Salam, Mohamed R. H., et al., "Experimental Study of Effects of Phase-Change Energy and Operating Parameters on Performances of Two-Fluid and Three-Fluid Liquid-to-Air Membrane Energy Exchangers", ASHRAE Transactions, vol. 122, Part 1, (Jan. 2016), 134-145.

(56) References Cited

OTHER PUBLICATIONS

Abdel-Salam, Mohamed R. H., et al., "Performance testing of 2-fluid and 3-fluid liquid-to-air membrane energy exchangers for HVAC applications in cold-dry climates", International Journal of Heat and Mass Transfer, 106, (2017), 558-569.

Abdel-Salam, Mohamed R. H., et al., "Performance testing of a novel 3-fluid liquid-to-air membrane energy exchanger (3-fluid LAMEE) under desiccant solution regeneration operating conditions", International Journal of Heat and Mass Transfer, 95, (2015), 773-786.

Bergero, Stefano, et al., "On the performances of a hybrid airconditioning system in different climatic conditions", Energy 36(8), (2011), 5261-5273.

Erb, Blake, et al., "Experimental Measurements of a Run-Around Membrane Energy Exchanger (RAMEE) with Comparison to a Numerical Model", ASHRAE Transactions, (2009).

Karniadakis, George E., et al, "Mimimum-dissipation transport enhancement by flow destabilization: Reynolds' analogy revisited", J. Fluid Mech vol. 192, (1988), 365-391.

Larson, Michael David, et al., "The Performance of Membranes in a Newly Proposed Run-Around Heat and Moisture Exchanger", Thesis Submitted to the College of Graduate Studies and Research In Partial Fulfillment of the Requirements For the Degree of Master of Saskatoon Canada, http/ /lib ran. usask.ca/theses/available/etd-12192006-094159/umestricted/Larson Thesis.pdf, (Dec. 2006), 177 pgs.

Lepoudre, P., et al., "Channel Flow with Sinusoidal Screen insert", Dept. of Mech Engineering, Univ. of Saskatchewan, Proceedings of the 19th Annual Conference of the CFD Society of Canada, Montreal, Apr. 28-29, 2011, (2011), 6 pgs.

Mahmud, Khizir, "Design and Performance Testing of Counter-Cross-Flow Run-Around Membrane Energy Exchanger System", Master Thesis Submitted to the College of Graduate Studies and Research In Partial Fulfillment of the Requirements for the Degree of Master of Science in the Department of Mechanical Engineering University of Saskatchewan Saskatoon Canada, http I /libran•. usask. ca/theses/ available/ etd-09092009-223 83 3/umestricted/ Khizir_Mahmud 2009-Sep-28a. pdf, (Sep. 2009), 176 pgs.

Mahmud, Khizir, et al., "Performance testing of a counter-crossflow run-around membrane energy exchanger (RAMEE) system for HVAC applications", Energy and Buildings, 42 (2010), 1140-1146.

Ryan, K., et al., "Three-dimensional transition in the wake of bluff elongated cylinders", J. Fluid, Mech vol. 538, (2005), 1-29.

Sorin, Ain A., et al., "Optimization of Flow Design in Forced Flow Electrochemical Systems, with Special Application to Electrodialysis", Ind. Eng. Chem, Process Des. Develop vol. 13, No. 3. (1974), 241-248.

Vali; et al., "Numerical model and effectiveness correlations for a run-around heat recovery system with combined counter and cross flow exchangers", International Journal of Heat and Mass Transfer 52, (2009), 5827-5840 pgs.

Vali, Alireza, "Modeling a Run-Around Heat and Moisture Exchanger Using Two Counter/Cross Flow Exchangers", Master Thesis Submitted to the College of Graduate Studies and Research In Partial Fulfillment of the Requirements For the Degree of Master of Science In the Department of Mechanical Engineering University of Saskatchewan Saskatoon Canada, http:/ /library. usask.ca/theses/m ailable/etd-060 3 2009-15-J.6-J.-1./unrestricted/ Vali.Alireza Thesis. pdf, (2009), 193 pgs.

"U.S. Appl. No. 13/449,598, Notice of Allowance dated Jul. 6, 2017", 7 pgs.

"U.S. Appl. No. 13/797,152, Notice of Allowance dated Jun. 27, 2017", 8 pgs.

"U.S. Appl. No. 14/171,951, Notice of Allowance dated Jun. 8, 2017", 5 pgs.

"U.S. Appl. No. 14/187,413, Final Office Action dated Jun. 27, 2017", 16 pgs.

"U.S. Appl. No. 14/187,413, Response filed Jun. 8, 2017 to Non Final Office Action dated Feb. 8, 2017", 15 pgs.

"U.S. Appl. No. 14/190,715, Response filed 07-12-17 to Restriction Requirement dated Apr. 12, 2017", 7 pgs.

"U.S. Appl. No. 14/192,019, Non Final Office Action dated May 19, 2017", 15 pgs.

"European Application Serial No. 14765396.8, Response filed May 25, 2017 to Extended European Search Report dated Oct. 28, 2016", 5 pgs.

"International Application Serial No. PCT/CA2013/000964, International Search Report dated Feb. 7, 2014", 3 pgs.

"International Application Serial No. PCT/CA2013/000964, Written Opinion dated Feb. 7, 2014", 6 pgs.

"U.S. Appl. No. 14/957,795, Non Final Office Action dated Apr. 3, 2017", 19 pgs.

"U.S. Appl. No. 14/957,795, Response filed Aug. 3, 2017 to Non Final Office Action dated Apr. 3, 2017", 17 pgs.

"Australian Application Serial No. 2012304223, Response filed Feb. 16, 2017 to First Examiner Report dated Aug. 5, 2016", 25 pgs.

"Australian Application Serial No. 2013305427, Examination Report dated Mar. 3, 2017", 4 pgs.

"Australian Application Serial No. 2014231681, First Examiners Report dated Jul. 12, 2017", 4 pgs.

"Australian Application Serial No. 2015230799, First Examiner Report dated Mar. 27, 2017", 10 pgs.

"Canadian Application Serial No. 2,801,352, Response filed Feb. 8, 2017 to Office Action dated Aug. 15, 2016", 89 pgs.

"Canadian Application Serial No. 2,901,483, Office Action dated Jul. 19, 2017", 3 pgs.

"Canadian Application Serial No. 2,901,483, Response filed May 23, 2017 to Office Action dated Nov. 23, 2016", 40 pgs.

"Chinese Application Serial No. 201380042926.0, Office Action dated May 11, 2017", W/ English Translation, 13 pgs.

"Chinese Application Serial No. 201380042926.0, Response filed Feb. 13, 2017 to Office Action dated Sep. 28, 2016", (w/ English Translation of Amended Claims), 56 pgs.

"Chinese Application Serial No. 201380044484.3, Response filed Mar. 28, 2017 to Office Action dated Jan. 13, 2017", (w/ English Translation of Claims), 58 pgs.

"Chinese Application Serial No. 201480014783,7. Office Action dated Jun. 30, 2017", (English Translation), 19 pgs.

"Chinese Application Serial No. 201480015355.6, Response filed Jun. 13, 2017 to Office Action dated Nov. 28, 2016", (w/ English Translation of Claims), 36 pgs.

"Chinese Application Serial No. 201480015422.4, Response filed May 12, 2017 to Office Action dated Nov. 1, 2016", w/ claims in English, 47 pgs.

"Chinese Application Serial No. 201480015766.5. Response filed Jan. 20, 2017 to Office Action dated Oct. 19, 2016", (w/ English Translation of Claims), 52 pgs.

"Chinese Application Serial No. 201480016150.X, Office Action dated Jun. 19, 2017", (w/ English Translation), 22 pgs.

"European Application Serial No. 14764305.0, Extended European Search Report dated Apr. 4, 2017", 8 pgs.

"European Application Serial No. 14764713.5, Response filed Jul. 13, 2017 to Extended European Search Report dated Dec. 9, 2016", 9 pgs.

\* cited by examiner

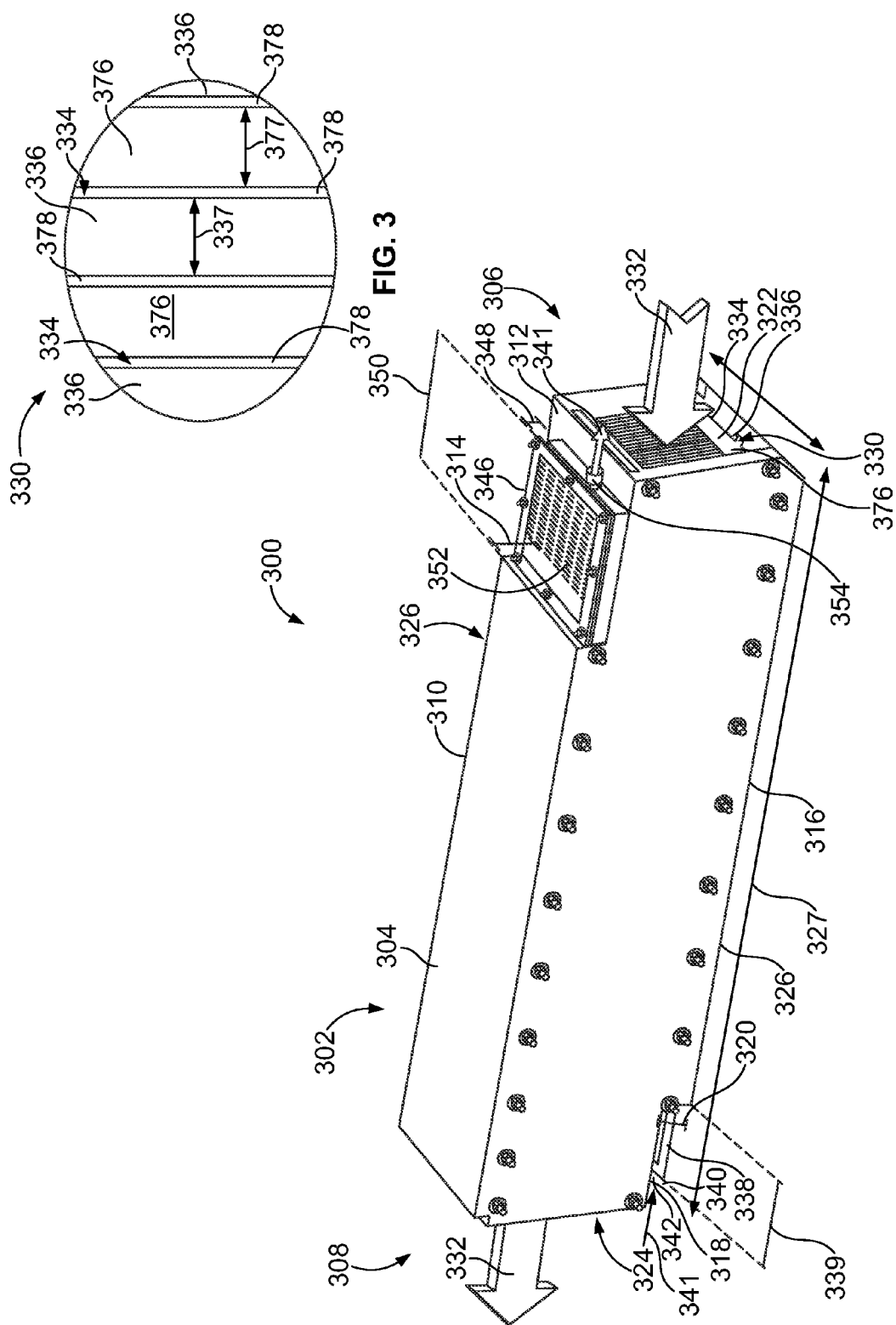

VARIABLE DESICCANT CONTROL ENERGY EXCHANGE SYSTEM AND METHOD

CROSS REFERENCE TO RELATED APPLICATIONS

The present application is a continuation of U.S. patent application Ser. No. 13/801,280, entitled "Variable Desiccant Control Energy Exchange System and Method," filed Mar. 13, 2013, which is hereby expressly incorporated by reference in its entirety.

BACKGROUND OF THE DISCLOSURE

Embodiments of the present disclosure generally relate to an energy exchange system for conditioning air in an enclosed structure, and more particularly, to a system and method for adjusting, varying, or otherwise controlling parameters of a liquid desiccant within the energy exchange system.

Enclosed structures, such as occupied buildings, factories and the like, generally include a heating/ventilation/air conditioning (HVAC) system for conditioning outdoor ventilated and/or recirculated air. The HVAC system typically includes a supply air flow path and an exhaust air flow path. The supply air flow path receives pre-conditioned air, for example outside air or outside air mixed with re-circulated air, and channels and distributes the pre-conditioned air into the enclosed structure. The pre-conditioned air is conditioned by the HVAC system to provide a desired temperature and humidity of supply air discharged into the enclosed structure. The exhaust air flow path discharges air back to the environment outside the structure. Without energy recovery, conditioning the supply air typically requires a significant amount of auxiliary energy, particularly in environments having extreme outside air conditions that are much different than the required supply air temperature and humidity. Accordingly, energy exchange or recovery systems are used to recover energy from the exhaust air flow path.

Conventional energy exchange systems may utilize energy recovery devices (for example, energy wheels and permeable plate exchangers) or heat exchange devices (for example, heat wheels, plate exchangers, heat-pipe exchangers and run-around heat exchangers) positioned in both the supply air flow path and the return air flow path. Liquid-to-air membrane energy exchangers (LAMEEs) may be fluidly coupled so that a desiccant liquid flows between the LAMEEs in a run-around loop, similar to run-around heat exchangers that typically use aqueous glycol as a coupling fluid.

Typically, a conventional HVAC system is sized depending on cooling, heating, and ventilation peak loads of a particular enclosed structure. In some systems, a constant air volume is supplied to each room within an enclosed structure. As such, a temperature of the air supplied to each room is generally similar. In other systems, the air volume may be varied, through dampers, supply paths, exhaust paths and the like. For example, output from cool and warm air paths may be mixed in order to vary the temperature of a particular room.

Typically, however, while known systems may be able to vary temperature within separate and distinct rooms, zones, or spaces, humidity generally cannot be independently controlled. Yet, different rooms, zones, or spaces may have different humidity levels based on latent loading (for example, the number of people within each particular zone), and/or different humidity level requirements. Yet, in known systems, when humidity is varied, the humidity level of all of the rooms is generally changed accordingly. Additionally, known systems may utilize relatively high levels of energy in order to alter temperature and/or humidity. Further, known systems typically cool air to dew point in order to remove moisture. As such, in order to alter humidity levels, the air supplied to a room may be lower than desired, and may often require an additional heating device to raise the level of supplied air. Because additional heating devices may be used, more energy may be used to condition the air that is supplied to the room.

SUMMARY OF THE DISCLOSURE

Certain embodiments of the present disclosure provide a system for providing conditioned air to at least one enclosed structure. The system may include at least one conditioning module comprising a conditioning energy exchanger configured to provide conditioned air to the at least one enclosed structure. The conditioning module(s) is configured to circulate desiccant to condition air passing through the conditioning module(s). The conditioning module(s) is configured to receive one or both of warm concentrated desiccant or cool diluted desiccant in order to vary the temperature and/or concentration of the desiccant circulating through the conditioning module(s). Optionally, the conditioning module(s) may be configured to receive one or both of cool concentrated desiccant or warm diluted desiccant in order to vary the temperature and/or concentration of the desiccant circulating through the conditioning module(s). The conditioning module(s) may include a conditioning liquid-to-air membrane energy exchanger (LAMEE) configured to circulate the desiccant and condition the air.

The conditioning module may include a warm tap line connecting a heat exchanger of the conditioning module(s) to a warm loop configured to circulate the warm concentrated desiccant therethrough, a cool tap line connecting the heat exchanger to a cool loop configured to circulate the cool diluted desiccant therethrough. The conditioning module(s) may also or alternatively include at least one desiccant mixing chamber configured to receive the desiccant, a warm tap line connected to the mixing chamber, and a cool tap line connected to the mixing chamber. The desiccant mixing chamber may be configured to receive one or both of the warm concentrated desiccant from the warm tap line or the cool diluted desiccant from the cool tap line and mix the desiccant therewith.

The system may also include a desiccant regeneration module configured to regenerate the desiccant. The desiccant regeneration module may include a regeneration LAMEE configured to regenerate the desiccant. The system may also include a heat source operatively connected to the desiccant regeneration module. The heat source is configured to exchange sensible energy with the desiccant flowing through the desiccant regeneration module. The system may also include a heating module operatively connected to the desiccant regeneration module through a heat pump. The system may also include a control sub-system configured to control variation of the temperature and concentration of the desiccant. The system may also include a water source configured to dilute the desiccant. The system may also include a bypass duct configured to bypass airflow around the at least one conditioning module.

The at least one conditioning module may include a plurality of conditioning and/or filtration modules. Each of the plurality of conditioning modules may be operatively connected to one of a plurality of enclosed structures. A regeneration module may be operatively connected to each of the plurality of conditioning modules. A desiccant connection conduit may connect at least one of the plurality of conditioning modules to at least another of the plurality of conditioning modules.

The system may also include a warm loop configured to circulate the warm concentrated desiccant therethrough, and a cool loop configured to circulate the cool diluted desiccant therethrough. A heat pump may be operatively connected between the warm and cool loops.

The system may also include a concentrated desiccant storage tank connected to the warm loop. The concentrated desiccant storage tank may be configured to provide additional concentrated desiccant to the warm loop.

Certain embodiments of the present invention provide a method of providing conditioned air to at least one enclosed structure. The method may include monitoring a temperature of air within the enclosed structure(s), monitoring a humidity level of the air within the enclosed structure(s), conditioning the air within the enclosed structure(s) with at least one conditioning module, wherein the conditioning operation includes exchanging sensible and latent energy between the air and desiccant that circulates through the conditioning module(s), controlling the temperature of the desiccant based on the monitoring a temperature operation, and controlling the concentration of the desiccant based on the monitoring a humidity level operation.

The method may include circulating warm concentrated desiccant through a warm loop that connects to the conditioning module(s), and circulating cool diluted desiccant through a cool loop that connects to the conditioning module(s). Additionally, the method may include exchanging sensible energy between the warm and cool loops through a heat pump connected therebetween. Additional concentrated desiccant may be provided to the warm loop through a concentrated desiccant storage tank.

The controlling the concentration operation may include mixing one or both of the warm concentrated desiccant from the warm loop or the cool diluted desiccant from the cool loop with the desiccant in a mixing chamber of the at least one conditioning module. The controlling the temperature operation may include exchanging sensible energy between the desiccant within the conditioning module(s) with one or both of the of the warm concentrated desiccant from the warm loop or the cool diluted desiccant from the cool loop.

The method may also include regenerating the warm concentrated desiccant with a desiccant regeneration module. Further, the method may include heating a fluid with a heat source, and exchanging sensible energy between the desiccant flowing through the desiccant regeneration module and the fluid. The method may also include operatively connecting a heating module to the desiccant regeneration module through a heat pump.

The method may also include diluting the desiccant with water from a water source. Further, the method may include bypassing airflow around the conditioning module(s). The method may also include connecting first and second conditioning modules with a desiccant connection conduit, and transferring the desiccant between the first and second conditioning modules through the desiccant connection conduit.

It is to be understood that the systems and methods may be used with warm concentrated desiccant, cool concentrated desiccant, warm diluted desiccant, and/or cool diluted desiccant, and various desiccants therebetween.

BRIEF DESCRIPTION OF THE DRAWINGS

FIG. 2 illustrates a side perspective view of a liquid-to-air membrane energy exchanger, according to an embodiment of the present disclosure.

FIG. 3 illustrates a front view of panels within an energy exchange cavity of a liquid-to-air membrane energy exchanger, according to an embodiment of the present disclosure.

DETAILED DESCRIPTION OF THE DRAWINGS

The foregoing summary, as well as the following detailed description of certain embodiments will be better understood when read in conjunction with the appended drawings. As used herein, an element or step recited in the singular and proceeded with the word "a" or "an" should be understood as not excluding plural of said elements or steps, unless such exclusion is explicitly stated. Furthermore, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

Embodiments of the present disclosure provide systems and methods of controlling parameters, such as temperature and concentration, of desiccant supplied to conditioning modules that are configured to supply conditioned air to one or more enclosed structures. For example, embodiments of the present disclosure provide systems and methods of altering, adjusting, changing, varying, or otherwise controlling the temperature and/or concentration of desiccant supplied to a conditioning module. By controlling the parameters of desiccant supplied to conditioning modules, embodiments of the present disclosure are able to efficiently adjust temperature and humidity levels within one or more enclosed structures.

Figure 1:
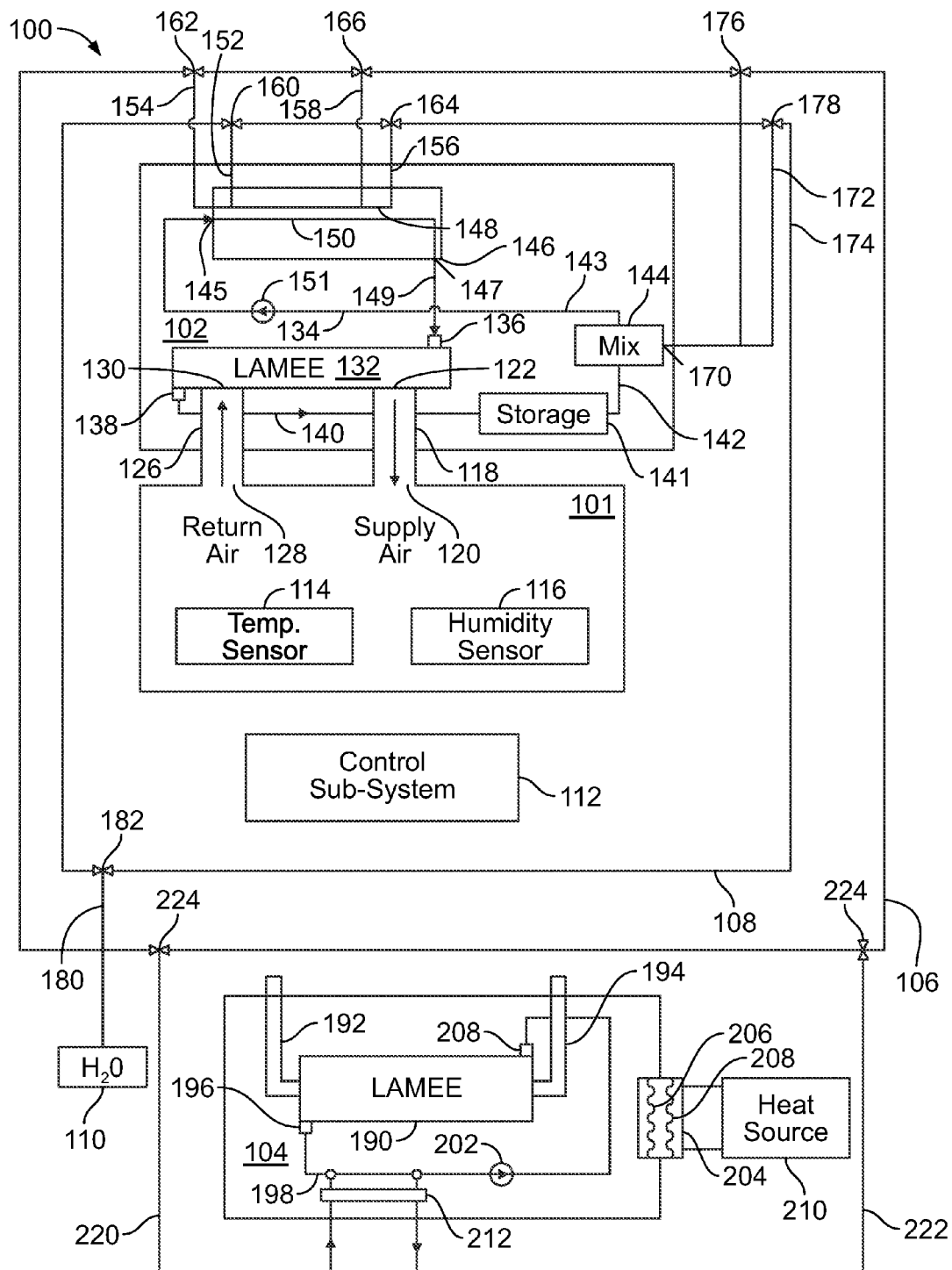
FIG. 1 illustrates a schematic view of an energy exchange system, according to an embodiment of the present disclosure.

FIG. 1 illustrates a schematic view of an energy exchange system 100, according to an embodiment of the present disclosure. The system 100 is configured to partly or fully condition air supplied to an enclosed structure 101. The system 100 may include a conditioning module 102 in fluid communication with the enclosed structure 101, a desiccant regeneration module 104, a warm concentrated desiccant loop 106 (the "warm loop") in fluid communication with the conditioning module 102 and the desiccant regeneration module 104, a cool diluted desiccant loop 108 (the "cool loop") in fluid communication with the conditioning module 102 and the desiccant regeneration module 104, a water supply 110 in fluid communication with the cool water loop 108, and a control sub-system 112. It is to be understood that the components of the system 100 are drawn for clarity and simplicity, but are not drawn to scale.

The conditioning module 102 and the desiccant regeneration module 104 may be secured to various portions of the enclosed structure 101. For example, the conditioning module 102 and the desiccant regeneration module 104 may be mounted on a roof of the enclosed structure 101, secured outside of the enclosed structure 101, positioned within plenums or interior chambers of the enclosed structure 101, and/or the like. Similarly, the warm loop 106 and the cool loop 108 may include sealed conduits, for example, secured outside or inside the enclosed structure 101. The control sub-system 112 may be located within the enclosed structure 101, and is in operative communication with the conditioning module 102 and the desiccant regeneration module 104. Alternatively, the control sub-system 112 may be remotely located from the enclosed structure 101.

The warm loop 106 may circulate warm concentrated desiccant therethrough. As an example, the temperature of the concentrated desiccant within the warm loop 106 may be 20° C. or greater, while the temperature of the concentrated desiccant within the cool loop 108 may be less than 20° C. Additionally, the desiccant concentration in the warm loop 106 may be 30% or greater, while the desiccant concentration in the cool loop 108 may be less than 30%. As one example, the temperature of the concentrated desiccant within the warm loop 106 may be between 25°-28° C., while the desiccant concentration may be between 30-50%. The cool loop 108 may circulate cool, diluted desiccant therethrough. As an example, the temperature of the diluted desiccant within the cool loop 108 may be between 15°-18° C., while the desiccant concentration may be between 10-15%. However, it is to be understood that the temperatures and concentrations noted are merely examples, and are in no way limiting. For example, the threshold temperature between cool and hot may be greater or less than 20° C., while the threshold concentration between concentrated and diluted may be greater or less than 30%. In general, the desiccant within the warm loop 106 may be at a higher temperature and higher concentration than the desiccant within the cool loop 108. While not shown, each of the warm loop 106 and the cool loop 108 may include one or more pumps disposed therein that circulate the desiccants therethrough.

The warm and cool loops 106 and 108 may be formed of pipes, such as flexible tubing, polyvinyl chloride (PVC) or the like. The diameters of the pipe may be between ½"-¾", for example.

The enclosed structure 101 may be an enclosed space within a building, for example, and includes a temperature sensor 114, such as a digital thermometer, and a humidity sensor 116, such as a digital humidistat, that are in communication with the control sub-system 112. As such, the control sub-system 112 is configured to monitor the temperature and the humidity level within the enclosed structure 101 through the temperature and humidity sensors 114 and 116, respectively. While shown as separate and distinct sensors, the temperature and humidity sensors 114 and 116 may optionally be contained within a common housing.

A supply air path 118 connects an air inlet 120 of the enclosed structure 101 to an air outlet 122 of the conditioning module 102. Similarly, a return air path 126 connects an air outlet 128 of the enclosed structure 101 to an air inlet 130 of the conditioning module 102. The supply air path 118 and the return air path 126 may be conduits, pipes, ducts, and/or the like that are configured to channel air therethrough. As shown in FIG. 1, conditioned air is supplied from the conditioning module 102 to the enclosed structure 101 through the supply air path 118. Return air from the enclosed structure is returned to the conditioning module 102 via the return air path 126. The conditioning module 102 conditions the return air to desired conditions, including a desired temperature and humidity, and provides the conditioned air to the enclosed structure 101 through the supply air path 118. While shown as a closed loop, in which supply air is provided to the enclosed structure 101 and returned to the conditioning module 102, it is to be understood that outside air may also be mixed with the return air that is supplied to the conditioning module 102. Alternatively, instead of a return air path, the enclosed structure 101 may include an exhaust air path that vents exhaust air to the atmosphere, instead of recirculating the air back to the conditioning module 102.

The conditioning module 102 may include a conditioning energy exchanger, such as a conditioning liquid-to-air membrane energy exchanger (LAMEE) 132 connected to the air outlet 122 and the air inlet 130. That is, the conditioning LAMEE 132 may have an air outlet in fluid communication with the air outlet 122, and an air inlet in fluid communication with the air inlet 130. The conditioning LAMEE 132 is configured to receive the return air from the enclosed structure 101, condition the air, and supply the conditioned air to the enclosed structure 101. As explained below, the conditioning LAMEE 132 may include a plurality of air channels separated by desiccant channels. Desiccant flows through the desiccant channels and exchanges sensible and latent energy with air flowing through the air channels. In this manner, the air may be conditioned.

The conditioning LAMEE 132 is in fluid communication with a desiccant circuit 134 including piping, conduits, or the like configured to circulate liquid desiccant therethrough. Various types of liquid desiccant may be circulated through the system 100 and the desiccant circuit 134, including lithium chloride, magnesium chloride, lithium bromide, calcium chloride, glycol, and the like. The conditioning LAMEE 132 includes a desiccant inlet 136 and a desiccant outlet 138 in communication with the desiccant circuit 134.

The desiccant circuit 134 includes a conduit 140 that connects the desiccant outlet 138 to a desiccant storage tank 141. A conduit 142 connects the desiccant storage tank 141 to a desiccant mixing chamber, such as a desiccant mixing manifold 144. A conduit 143 connects the desiccant mixing manifold 144 to an inlet 145 of a heat exchanger 146. A conduit 149 connects an outlet 147 of the heat exchanger 146 to the desiccant inlet 136 of the conditioning LAMEE 132. One or more pumps 151 may be disposed within the desiccant circuit 134 to pump the desiccant therethrough.

The heat exchanger 146 includes a desiccant line 150 that connects the inlet 145 to the outlet 147. The heat exchanger 146 also includes a loop line 148 that connects to a cool tap line 152, a warm tap line 154, a cool return line 156, and a warm return line 158. The cool tap line 152 may connect to the cool loop 108 through a valve 160. The warm tap line 154 may connect to the warm loop 106 through a valve 162. The cool return line 156 may connect to the cool loop 108 through a valve 164, while the warm return line 158 may connect to the warm loop 106 through a valve 166. The control sub-system 112 may be in operative communication with each of the valves 160, 162, 164, and 166. The control sub-system 112 may be configured to operate the valves 160, 162, 164, and 166 in order to allow cool diluted and/or warm concentrated desiccant from the cool loop 108 and the warm loop 106, respectively, to pass into the loop line 148. While shown as separate and distinct lines connecting directly to the loop line 148, the cool tap line 152 and the warm tap line 154 may alternatively connect to a common conduit that directly connects to the loop line 148. Similarly, the loop line 148 may alternatively include a single outlet that branches off to each of the warm line 106 and the cool line 108.

The mixing manifold 144 may include an inlet conduit 170 that connects to a warm tap line 172 and a cool tap line 174. The warm tap line 172 may connect to the warm loop 106 through a valve 176, while the cool tap line 174 may connect to the cool loop 108 through a valve 178. The control sub-system 112 may be configured to operate the valves 176 and 178 in order to allow cool diluted and/or warm concentrated desiccant from the cool loop 108 and the warm loop 106, respectively, to pass into the mixing manifold 144. While the inlet conduit 170 is shown as connecting to each of the warm tap line 172 and the cool tap line 174, each of the warm tap line 172 and the cool tap line 174 may alternatively connect directly and separately to separate inlets of the mixing manifold 144.

In operation, the control sub-system 112 detects the temperature and humidity levels of the enclosed structure 101 through the temperature and humidity sensors 114 and 116, respectively. Depending on desired temperature and humidity levels, the control sub-system 112 may control parameters of the desiccant within the desiccant circuit 134. For example, the control sub-system 112 may alter the temperature and/or concentration of the desiccant.

In order to control the temperature of the desiccant, the control sub-system 112 may selectively open and close certain valves in order to allow warm or cool desiccant into the heat exchanger 146. For example, if the temperature of the desiccant is to be increased, the control sub-system 112 may open the valve 162 in order to allow warm concentrated desiccant to pass through the loop line 148. As the temperature of the desiccant within the loop line 148 increases, the temperature of the desiccant within the desiccant line 150 increases. That is, the sensible energy of the warmer desiccant within the loop line 148 is transferred to the desiccant circulating through the desiccant line 150, thereby increasing the temperature of the desiccant that is supplied to the conditioning LAMEE 132. The higher temperature desiccant within the conditioning LAMEE 132 transfers sensible energy to the air within the conditioning LAMEE 132, thereby providing higher temperature supply air to the enclosed structure 101.

Conversely, if the temperature of the desiccant is to be decreased, the control sub-system 112 may open the valve 160 in order to allow cool diluted desiccant to pass through the loop line 148. As the temperature of the desiccant within the loop line 148 decreases, the temperature of the desiccant within the desiccant line 150 decreases. That is, the sensible energy of the cooler desiccant within the loop line 148 is exchanged with the desiccant circulating through the desiccant line 150, thereby decreasing the temperature of the desiccant that is supplied to the conditioning LAMEE 132. The lower temperature desiccant within the conditioning LAMEE 132 exchanges sensible energy with the air within the conditioning LAMEE 132, thereby providing lower temperature supply air to the enclosed structure 101.

The control sub-system 112 may selectively open and close both the valves 162 and 160 between fully-open and fully-closed positions. Accordingly, the control sub-system 112 may modulate the temperature and concentration of the desiccant passing through the loop line 148 between fully warm/hot and fully cool/cold temperatures. In this manner, the control sub-system 112 may fine tune the temperature and concentration of the desiccant flowing through the conditioning LAMEE 132.

As described above, the control sub-system 112 may vary the temperature of the desiccant flowing through the conditioning LAMEE 132 by way of the controlling the temperature of desiccant that passes through the heat exchanger 146. Additionally, as described below, the control sub-system 112 may vary the concentration of the desiccant flowing through the conditioning LAMEE 132 in order to control the latent energy of the desiccant.

In order to increase the latent energy of the desiccant, the control sub-system 112 may open the valves 176 or 178 in order to allow warm concentrated or cool diluted desiccant to mix within the desiccant within the mixing manifold 144. Either warm concentrated desiccant or cool diluted desiccant may be used to alter the concentration of the desiccant within the mixing manifold 144. The control sub-system 112 may select either or both of warm and cool desiccant, depending on the desired temperature and concentration of the desiccant to be circulated through the conditioning LAMEE 132. The desiccant 140 may be stored in the desiccant storage 140 and pass from the desiccant storage 140 to the mixing manifold 144 by way of the conduit 142. In order to dilute the desiccant in order to increase its latent energy, the control sub-system 112 may divert cool diluted desiccant directly from the cool loop 108 into the mixing manifold. In order to increase the concentration of the desiccant, the control sub-system 112 may channel concentrated desiccant from the warm loop 106 directly into the mixing manifold 144. The desiccant mixes in the mixing manifold, and the mixed desiccant is then circulated to the conditioning LAMEE 132, as described above.

For example, a target desiccant concentration of 30% may be desired. The diluted desiccant may have a concentration of 20%, while the concentrated desiccant may have a concentration of 40%. In order to achieve the desired concentration, the diluted desiccant is mixed with the concentrated desiccant. The diluted and concentrated desiccants may be mixed in various parts to achieve a particular desiccant at a particular temperature. The concentration percentages noted are merely exemplary. Various desiccant concentrations may be used to achieve a desired target desiccant concentration at a desired temperature.

The control sub-system 112 may be operatively connected to various components of the system 100, such as the valves, through wired and/or wireless connections. Alternatively, the system 100 may not include the control sub-system 112. Instead, an individual may monitor the temperature and humidity of the enclosed structure and manually operate the various valves.

As noted above, the system 100 may also include the water source 110. The cool water loop 108 is in fluid communication with a water source 110 through a water input line 180. A valve 182 may be disposed between the water input line 180 and the water source 110. The control sub-system 112, for example, may control the valve 182 in order to allow fresh, purified water to be selectively input into the cool loop 108, in order to further cool the desiccant flowing therethrough and/or further dilute its concentration. The water source 110 may be a reverse osmosis water purification system configured to add purified water to the cool loop 108. Optionally, the water source 110 may also be connected to the warm loop 106.

As noted above, the system 100 may also include the regeneration module 104. The regeneration module 104 may be configured to regenerate the desiccant circulating through the warm loop 106. The regeneration module 104 includes a regeneration energy exchanger, such as a regeneration LAMEE 190, having an air inlet conduit 192 and an air outlet conduit 194. Outside air enters the regeneration LAMEE 190 through the air inlet conduit 192. The outside air passes through the regeneration LAMEE 190 and exchanges energy with desiccant circulating through the regeneration LAMEE 190. The air then passes through the regeneration LAMEE 190 and is exhausted through the air outlet conduit 194.

The regeneration LAMEE 190 includes a desiccant outlet 196 connected to a desiccant circuit 198 and a desiccant inlet 200 connected to the desiccant circuit 198. The desiccant circuit 198 may include one or more pumps 202 disposed therein that are configured to circulate desiccant through the desiccant circuit 198. A heat exchanger 204 is disposed within the desiccant circuit 198 and includes a desiccant line 206 and a heat line 208 connected to a heat source 210. The heat source 210 may be any type of device configured to supply heated energy to the heat line 208. For example, the heat source 210 may be a boiler that provides hot water or steam to the heat line 208, a source of natural gas, geothermal energy, solar energy, and/or the like. The heat source 210 provides heat energy to the heat line 208 that is then transferred to the desiccant within the desiccant line 206. As the temperature of the desiccant increases, the desiccant releases moisture (e.g., latent energy) into the air within the regeneration LAMEE 190. As such, the concentration of the desiccant increases. The concentrated desiccant, having an increased temperature, passes out of the regeneration LAMEE 190 through the desiccant outlet 196 and passes through a heat exchanger 212, before being supplied back to the warm loop 106. Within the heat exchanger 212, the regenerated desiccant exchanges sensible and latent energy with desiccant entering the regeneration module 104. A portion of the heat of the desiccant flowing out through the heat exchanger 212 is transferred to the desiccant flowing into the regeneration module 104 through the heat exchanger 212, thereby maintaining desiccant of increased heat within the regeneration module 104. Alternatively, the regeneration module 104 may not include the heat exchanger 212.

The regeneration module 104 may be connected to the warm loop 106 through an inlet conduit 220 and an outlet conduit 222, each of which may be connected to the warm loop 106 through a valve 224. As described above, the control sub-system 112, or an individual, may operatively control the valves 224 to selectively allow/prevent desiccant within the warm loop 106 from passing into the regeneration module 104.

As described above, the system 100 may be used to vary, altered, adapt, change, or otherwise control parameters or characteristics of desiccant flowing through the conditioning module 102. For example, the system 100 may alter or vary the temperature and/or concentration of the desiccant flowing through the conditioning module 102. Because the temperature and concentration of the desiccant may be actively controlled, the system 100 provides a variable desiccant control system and method that is able to efficiently control the temperature and humidity of air supplied to the enclosed structure 101.

Alternatively, the conditioning module 102 may include one or more three way valves operatively connected to one or more conditioning LAMEEs 132. The three way valves may be selectively operated to open and close fluid connections with the warm and cool loops 106 and 108. In this manner, desiccant may be continually circulated within the desiccant circuit 134 without intervention from either the warm or cool loops 106 and 108.

While the system 100 is shown with respect to the enclosed structure 101, the system 100 may be used with respect to multiple enclosed structures or zones. For example, each enclosed structure may include a separate and distinct conditioning module, as described above. Each conditioning module may be operatively connected to a central regeneration module. Alternatively, a single conditioning module and regeneration module may be operatively connected to multiple enclosed structures or zones, each of which includes separate and distinct temperature and humidity sensors.

As noted above, the system 100 may or may not include the control sub-system 100. Additionally, the system 100 may alternatively not include either the water source 110 and/or the regeneration module 104.

The control sub-system 112 may be contained within a workstation that may be or otherwise include one or more computing devices, such as standard computer hardware. The control sub-system 112 may include one or more control units, such as processing devices that may include one or more microprocessors, microcontrollers, integrated circuits, memory, such as read-only and/or random access memory, and the like.

The control sub-system 112 may be operatively connected to a display, such as a cathode ray tube display, a flat panel display, such as a liquid crystal display (LCD), a light-emitting diode (LED) display, a plasma display, or any other type of monitor. The control sub-system 112 may be configured to calculate temperature and humidity levels of air within the enclosed structure, various desiccant characteristics or parameters, and the like, and to show such information the display.

The control sub-system 112 may include any suitable computer-readable media used for data storage. The computer-readable media are configured to store information that may be interpreted by the control sub-system 112. The information may be data or may take the form of computer-executable instructions, such as software applications, that cause a microprocessor or other such control unit within the control sub-system 112 to perform certain functions and/or computer-implemented methods. The computer-readable media may include computer storage media and communication media. The computer storage media may include volatile and non-volatile media, removable and non-removable media implemented in any method or technology for storage of information such as computer-readable instructions, data structures, program modules or other data. The computer storage media may include, but are not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which may be used to store desired information and that may be accessed by components of the system.

FIG. 2 illustrates a side perspective view of a LAMEE 300, according to an embodiment of the present disclosure. The LAMEE 300 may be used as the conditioning LAMEE 132 (shown in FIG. 1) and/or the regeneration LAMEE 190 (shown in FIG. 1). The LAMEE 300 includes a housing 302 having a body 304. The body 304 includes an air inlet end 306 and an air outlet end 308. A top 310 extends between the air inlet end 306 and the air outlet end 308. A stepped-down top 312 may be positioned at the air inlet end 306. The stepped-down top 312 may be stepped a distance 314 from the top 310. A bottom 316 extends between the air inlet end 306 and the air outlet end 308. A stepped-up bottom 318 may be positioned at the air outlet end 308. The stepped-up bottom 318 may be stepped a distance 320 from the bottom 316. In certain embodiments, the stepped-up bottom 318 or stepped-down top 312 sections may have different sizes of steps or no step at all.

An air inlet 322 is positioned at the air inlet end 306. An air outlet 324 is positioned at the air outlet end 308. Sides 326 extend between the air inlet 322 and the air outlet 324.

An energy exchange cavity 330 extends through the housing 302 of the LAMEE 300. The energy exchange cavity 330 extends from the air inlet end 306 to the air outlet end 308. An air stream 332 is received in the air inlet 322 and flows through the energy exchange cavity 330. The air stream 332 is discharged from the energy exchange cavity 330 at the air outlet 324. The energy exchange cavity 330 includes a plurality of panels 334.

A desiccant inlet reservoir 338 may be positioned on the stepped-up bottom 318. The desiccant inlet reservoir 338 may have a height 340 equal to the distance 320 between the bottom 316 and the stepped-up bottom 318. Alternatively, the liquid desiccant inlet reservoir 338 may have any height that meets a desired performance of the LAMEE 300. The desiccant inlet reservoir 338 extends a length 339 of the LAMEE body 304. The length 339 may be configured to meet a desired performance of the LAMEE 300. In an embodiment, the desiccant inlet reservoir 338 may extend no more than one fourth of the length 327 of the LAMEE body 304. Alternatively, the desiccant inlet reservoir 338 may extend along one fifth, for example, of the length 327 of the LAMEE body 304.

The liquid desiccant inlet reservoir 338 is configured to receive desiccant 341. The desiccant inlet reservoir 338 includes an inlet 342 in flow communication with the storage tank 128. The desiccant 341 is received through the inlet 342. The desiccant inlet reservoir 338 includes an outlet that is in fluid communication with desiccant channels 376 in the energy exchange cavity 330. The liquid desiccant 341 flows through the outlet into the desiccant channels 376. The desiccant 341 flows along the panels 334 through the desiccant channels 376 to a desiccant outlet reservoir 346.

The desiccant outlet reservoir 346 may be positioned on the stepped-down top 312 of the housing 302. Alternatively, the desiccant outlet reservoir 346 may be positioned at any location along the top 312 of the LAMEE housing 302 or alternatively on the side of the reservoir with a flow path connected to all the panels. The desiccant outlet reservoir 346 has a height 348 that may be equal to the distance 314 between the top 310 and the stepped-down top 312. The desiccant outlet reservoir 346 extends along the top 312 of the LAMEE housing 302 for a length 350. In an embodiment, the length 350 may be no more than one fourth the length 327 of the flow panel exchange area length 302. In another embodiment, the length 350 may be one fifth, for example, the length 327 of the panel exchange area length 302.

The desiccant outlet reservoir 346 is configured to receive desiccant 341 from the desiccant channels 376 in the energy exchange cavity 330. The desiccant outlet reservoir 346 includes an inlet 352 in flow communication with the desiccant channels 376. The desiccant 341 is received from the desiccant channels 376 through the inlet 352. The desiccant outlet reservoir 346 includes an outlet 354. In an alternative embodiment, the desiccant outlet reservoir 346 may be positioned along the bottom 318 of the LAMEE housing 302 and the desiccant inlet reservoir 338 may be positioned along the top 310 of the housing 302.

As shown in FIG. 2, the LAMEE 300 includes one liquid desiccant outlet reservoir 346 and one liquid desiccant inlet reservoir 338. Alternatively, the LAMEE 300 may include liquid desiccant outlet reservoirs 346 and liquid desiccant inlet reservoirs 338 on the top and bottom of each of each end of a LAMEE 300. A liquid flow controller may direct the liquid flow to either the top or bottom.

FIG. 3 illustrates a front view of the panels 334 within the energy exchange cavity 300 of the LAMEE 300, according to an embodiment of the present disclosure. The liquid flow panels 334 form a liquid desiccant channel 376 that may be confined by semi-permeable membranes 378 on either side and is configured to carry desiccant 341 therethrough. The semi-permeable membranes 378 are arranged in parallel to form air channels 336 with an average flow channel width of 337 and liquid desiccant channels 376 with an average flow channel width of 377. In an embodiment, the semi-permeable membranes 378 are spaced to form uniform air channels 336 and liquid desiccant channels 376. The air stream 332 (shown in FIG. 2) travels through the air channels 336 between the semi-permeable membranes 378. The desiccant 341 in each desiccant channel 376 exchanges heat and moisture with the air stream 332 in the air channels 336 through the semi-permeable membranes 378. The air channels 336 alternate with the liquid desiccant channels 376. Except for the two side panels of the energy exchange cavity, each air channel 336 may be positioned between adjacent liquid desiccant channels 376.

In order to minimize or otherwise eliminate the liquid desiccant channels 376 from outwardly bulging or bowing, membrane support assemblies may be positioned within the air channels 336. The membrane support assemblies are configured to support the membranes, as well as promote turbulent air flow between the air channels 336 and the membranes 378. Membrane support assemblies that may be used in the LAMEE 300 are described and shown in U.S. application Ser. No. 13/797,062, entitled "Membrane Support Assembly for an Energy Exchanger," filed Mar. 12, 2013, which claims priority to U.S. Provisional Application No. 61/692,793, entitled "Membrane Support Assembly for an Energy Exchanger," filed Aug. 24, 2012, both of which are incorporated by reference in their entireties.

The LAMEE 300 may be a LAMEE as described in WO 2011/161547, entitled "Liquid-To-Air Membrane Energy Exchanger," filed Jun. 22, 2011, which is also hereby incorporated by reference in its entirety. Liquid panel assemblies that may be used in the LAMEE 300 are described and shown in U.S. application Ser. No. 13/797,152, entitled "Liquid Panel Assembly," filed Mar. 12, 2013, which claims priority to U.S. Provisional Application No. 61/692,798, entitled "Liquid Panel Assembly," filed Aug. 24, 2012, both of which are also incorporated by reference in their entireties.

Figure 4:
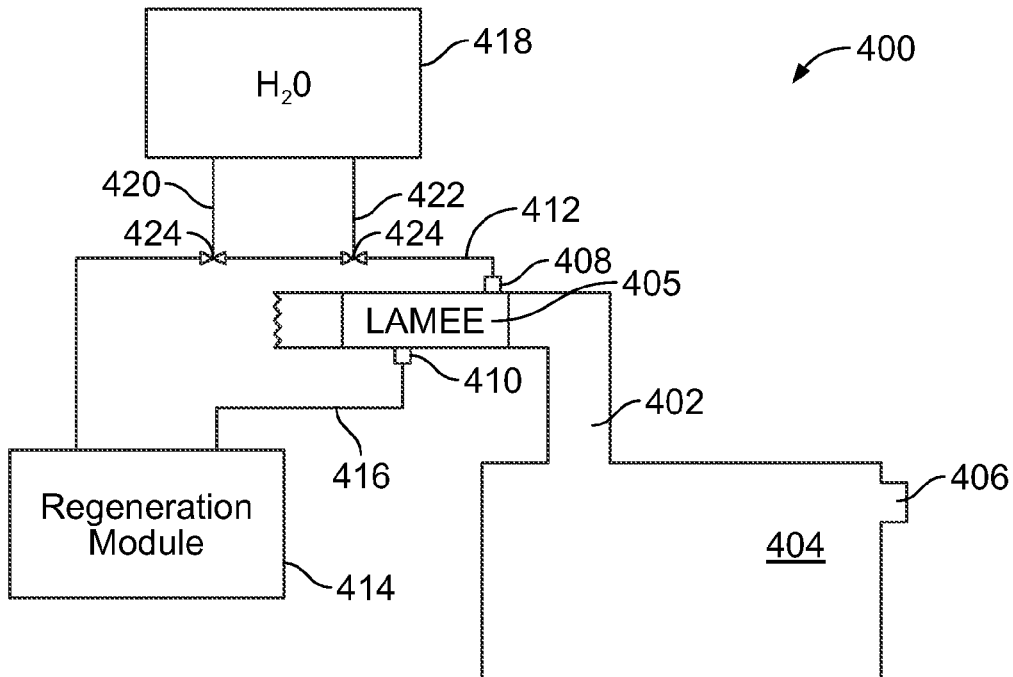
FIG. 4 illustrates a schematic of an energy exchange system, according to an embodiment of the present disclosure.

FIG. 4 illustrates a schematic of an energy exchange system 400, according to an embodiment of the present disclosure. The energy exchange system 400 includes a supply air flow path 402 configured to provide supply air to an enclosed structure 404. The supply air flow path 402 is configured to channel outside air through a conditioning energy exchanger, such as a conditioning LAMEE 405, which conditions the outside air and supplies the conditioned air to the enclosed structure 404. An exhaust flow path 406 allows exhaust air to be exhausted from the enclosed structure 404.

The conditioning LAMEE 405 includes a desiccant inlet 408 and a desiccant outlet 410. The desiccant inlet 408 is in fluid communication with a concentrated desiccant conduit 412 that connects to an outlet of a regeneration module 414. The desiccant outlet 410 is in fluid communication with a diluted desiccant conduit 416 that connects to an inlet of the regeneration module 414. The regeneration module 414 conditions desiccant and supplies concentrated desiccant to the conditioning LAMEE 405 and receives diluted desiccant from the conditioning LAMEE 405, similar as described above.

The system 400 may also include a water source 418 having a cool water input conduit 420 and a warm water input conduit 422 connected to the desiccant conduit 412 through valves 424. Optionally, the conduits 420 may be directly connected to the desiccant inlet 408 of the conditioning LAMEE 408.

As described above, temperature and humidity sensors within the enclosed structure may be in communication with a control sub-system (not shown in FIG. 4). The control sub-system or an individual may operatively control the valves 424 in order to provide cool or hot water from the cool water input conduit 420 and the warm water input conduit 422, respectively, in order to dilute the desiccant supplied to the conditioning LAMEE 405. The valves 424 may be modulated between fully open and fully closed positions in order to provide water at a wide range of temperatures to the desiccant within the concentrated desiccant conduit 412. As such, the temperature and concentration of the desiccant supplied to the conditioning LAMEE 405 may be varied.

Figure 5:
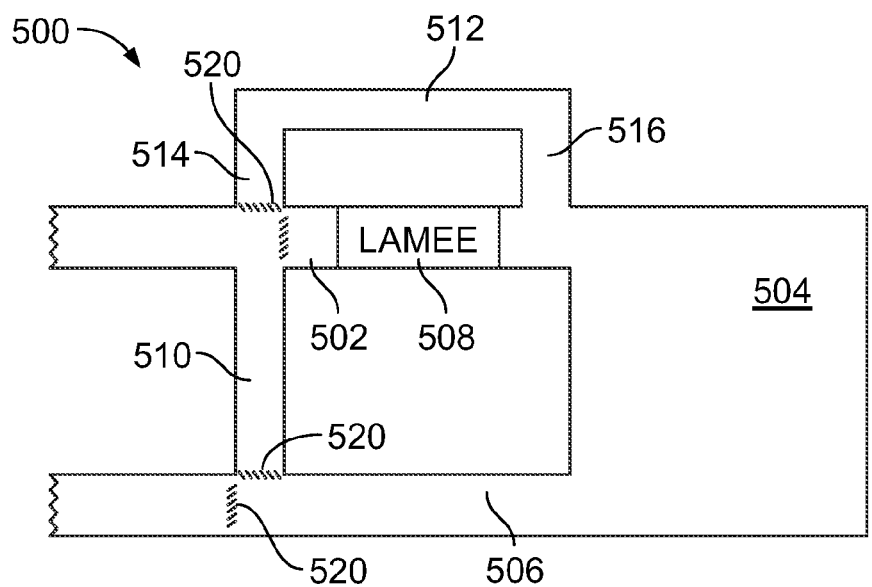
FIG. 5 illustrates a schematic of an energy exchange system, according to an embodiment of the present disclosure.

FIG. 5 illustrates a schematic of an energy exchange system 500, according to an embodiment of the present disclosure. The system 500 includes a supply air flow path 502 connected to an enclosed structure 504. The supply air flow patch 502 is configured to provide supply air to the enclosed structure 504. An exhaust or return air flow path 506 is also connected to the enclosed structure 504 and channels exhaust or return air from the enclosed structure.

A conditioning energy exchanger, such as a conditioning LAMEE 508 may be disposed within the supply air flow path 502 upstream from the enclosed structure 504. The conditioning LAMEE 508 is configured to condition the supply air that is provided to the enclosed structure 504.

A connecting path 510 may connect the return air flow path 508 to the supply air flow path 502. The connecting path 510 may connect to the supply air flow path 502 upstream from the conditioning LAMEE 508. A bypass duct 512 may connect to the supply air flow path 502 and include an inlet 514 upstream from the conditioning LAMEE 508 and an outlet 516 downstream from the conditioning LAMEE 508. Dampers 520 may be disposed within the supply air flow path 502, the bypass duct 512, and the connecting path 510. One or more of the dampers 520 may be operated to shunt return air from the return air flow path into the supply air flow path 502. Further, one or more of the dampers 520 may be operated to shunt air around the conditioning LAMEE 508. For example, all of the supply air may be directed around the LAMEE 508 within the bypass duct 512. Optionally, the one or more dampers 520 may be modulated in order to bypass a portion of air around the conditioning LAMEE 520. In this manner, air may be selectively directed through or bypassed around the conditioning LAMEE 508, thereby providing additional control of air supplied to the enclosed structure 504. The connecting path 510 and the bypass duct 512 may be used with respect to any of the embodiments of the present disclosure. A control sub-system, such as the control sub-system 112 (shown in FIG. 1), may be operatively connected to the dampers 520 in order to control the amount of air that is directed to the conditioning LAMEE 508.

Figure 6:
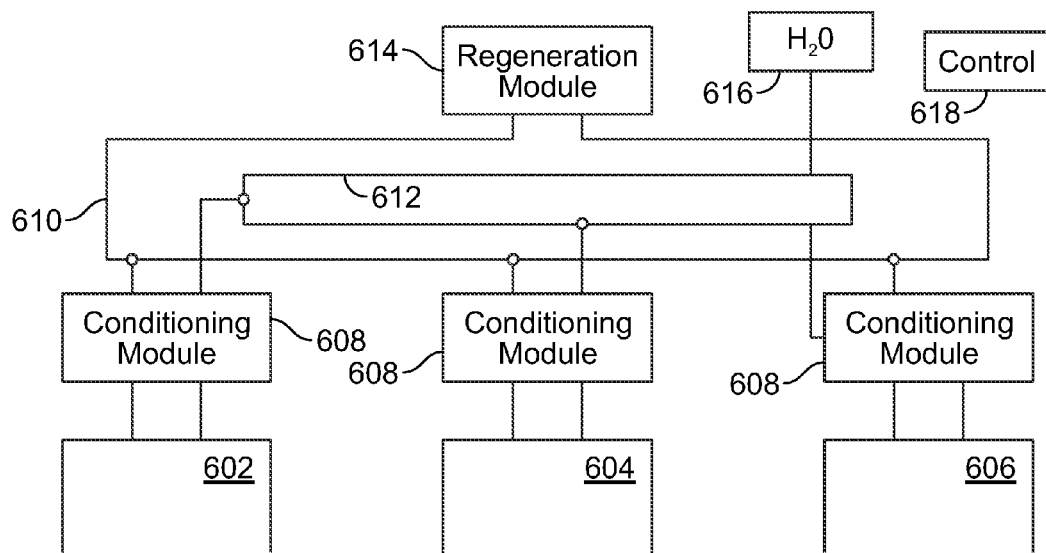
FIG. 6 illustrates a schematic of an energy exchange system, according to an embodiment of the present disclosure.

FIG. 6 illustrates a schematic of an energy exchange system 600, according to an embodiment of the present disclosure. The system 600 is similar to the system 100 described above, except that, instead of only one enclosed structure, the system 600 includes a plurality of enclosed structures or zones 602, 604, and 606. The enclosed structures 602, 604, and 606 may be separate and distinct buildings, for example, or they may be separate and distinct rooms or zones within a single building.

Each enclosed structure 602, 604, and 606 may be operatively connected to a separate and distinct conditioning module 608, each of which may be in fluid communication with a warm loop 610 and a cool loop 612. The warm loop 610 may be in fluid communication with a regeneration module 614, similar to the regeneration module 104 (shown in FIG. 1). A water source 616 may be connected to the cool loop 612, as described above. One or more pumps may be disposed within the warm and cool loops 610 and 612 in order to circulate desiccant therethrough. A control sub-system 618 may operatively control the components of the system 600, as described above with respect to FIG. 1.

In operation, each of the enclosed structures 602, 604, and 606 may be supplied with conditioned supply air from respective conditioning modules 608. The desiccant temperature and concentration may be monitored and varied depending on the particular temperature and humidity levels within each enclosed structure 602. As such, the system 600 provides variable conditioning to multiple zones, such as the enclosed structures 602, 604, and 606.

Figure 7:
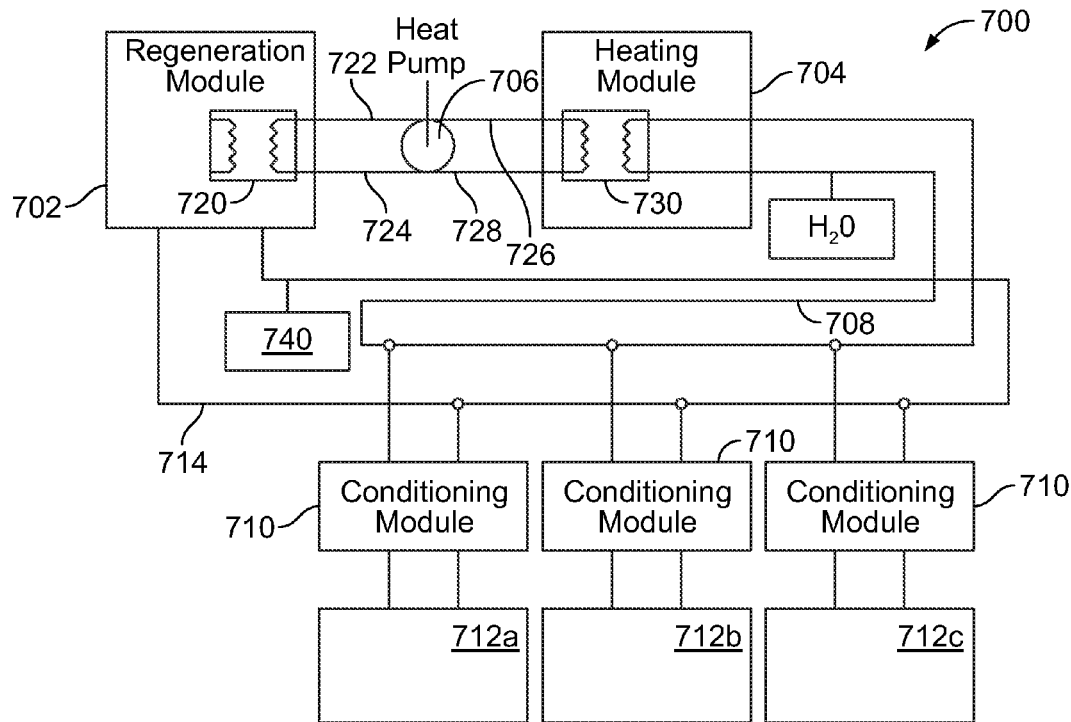
FIG. 7 illustrates a schematic of an energy exchange system, according to an embodiment of the present disclosure.

FIG. 7 illustrates a schematic of an energy exchange system 700, according to an embodiment of the present disclosure. The system 700 includes a regeneration module 702 connected to a heating module 704 through a heat pump 706. The heating module 704 is operatively connected to the cool loop 708. A water source 710 may also connect to the cool loop 708. One or more conditioning modules 710 of operatively connected to one or more enclosed structures 712a ... 712n may be in fluid communication with the cool and warm loops 708 and 714, as described above.

The regeneration module 702 is similar to the regeneration module 104 described above with respect to FIG. 1, except that a heat exchanger 720 within the regeneration module 702 connects to input and output lines 722 and 724 of the heat pump 706. The heat pump 706 also includes input and output lines 726 and 728 that connect to a heat exchanger 730 within the heating module 704. The heat pump 706 circulates refrigerant between the heat exchangers 720 and 730. Examples of refrigerant include R410a, R404, R134a, and the like. The refrigerant exchanges sensible energy with the desiccant flowing through the heat exchanger 720 within the regeneration module 702 and water flowing through the heat exchanger 730 within the heating module 730. As such, the heat pump 706 may transfer sensible energy between the desiccant circulating through the regeneration module 702 and the water circulating through the heating module 704. The heating module 704 may be operated to cool or heat the refrigerant circulating through the heat pump 706. The energy of the circulating refrigerant is then exchanged with the desiccant circulating through the regeneration module 702.

The system 740 may also include a concentrated desiccant storage tank 740 that may be tapped in order to provide additional concentrated desiccant into the warm loop 714. As such, the concentration of the desiccant circulating through the warm loop 714 may be altered by injecting concentrated desiccant from the storage tank 740 directly into the warm loop 714.

While not shown, a control sub-system, such as the control sub-system 112 shown in FIG. 1, may be used to vary the temperature and concentration of desiccant supplied to the conditioning modules 710. For example, the control sub-system may monitor the temperature and humidity levels of air within each of the enclosed structures 712a . . . 712n and adjust the temperature and concentration of the desiccant supplied to each conditioning module 710 accordingly.

Figure 8:
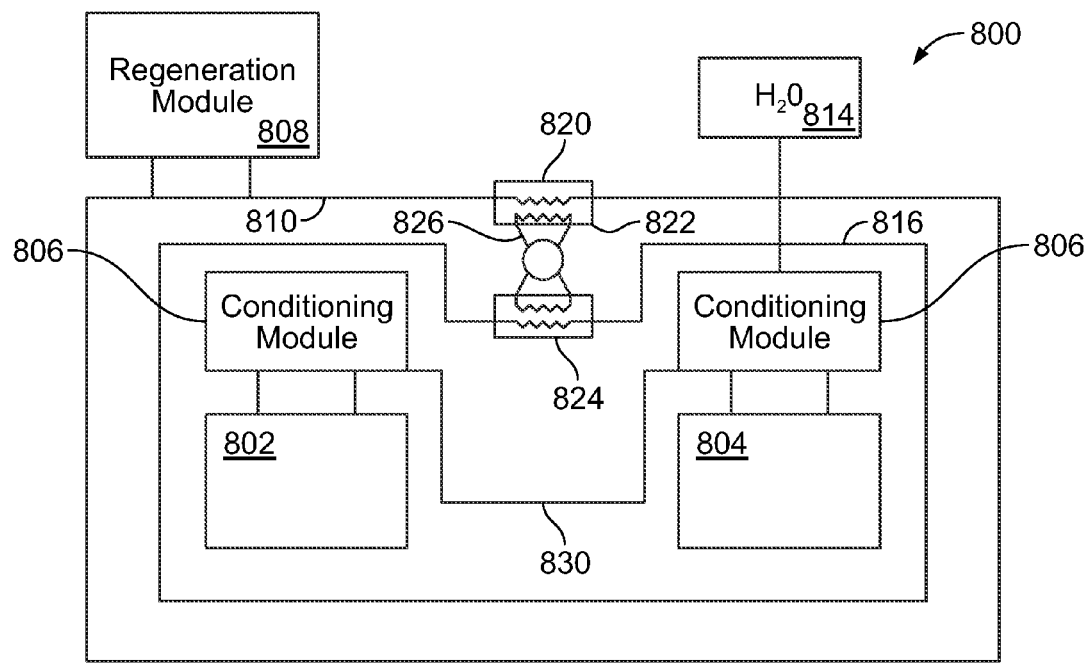
FIG. 8 illustrates a schematic of an energy exchange system, according to an embodiment of the present disclosure.

FIG. 8 illustrates a schematic of an energy exchange system 800, according to an embodiment of the present disclosure. The system 800 includes one or more enclosed structures 802 and 804, each of which is operatively connected to a conditioning module 806, as described above. A regeneration module 808, such as any of those described above, connects to a warm loop 810, while a water source 814 may connect to a cool loop 816.

A heat pump 820 may be disposed between the warm and cool loops 810 and 816. The heat pump 820 may be a liquid-to-liquid energy exchanger, for example. The heat pump 820 includes a first exchange portion 822 connected to a second exchange portion 824 through a fluid loop 826. A portion of the warm loop 810 passes through the first exchange portion 822, while a portion of the cool loop 816 passes through the second exchange portion 824. The fluid loop 826 circulates an energy exchange fluid, such as refrigerant, therein. Thus, the fluid within the fluid loop exchanges sensible energy with the desiccant in the warm loop 810 and the cool loop 816. Accordingly, the heat pump 820 serves to ensure a temperature difference between the warm and cool loop 810 and 816. The heat pump 820 may be used with respect to any of the embodiments of the present disclosure.

Additionally, the conditioning modules 806 may be connected by a connection conduit 830. The connection conduit 830 is configured to connect to the mixing modules (not shown in FIG. 8) of each of the conditioning modules 806. Two way valves may be disposed at the connection interfaces. Further, one or more pumps may be disposed within the connection conduit 830 and configured to pump desiccant between the conditioning modules 806. The connection conduit 830 allows portions of the mixed desiccant within each of the conditioning modules 806 to be transferred from one conditioning module 806 to the other. While not shown, a control sub-system, not shown in FIG. 8, may be used to control the transfer of desiccant between the conditioning modules 806. The connection conduit 830 may be used with respect to any of the embodiments of the present disclosure.

Figure 9:
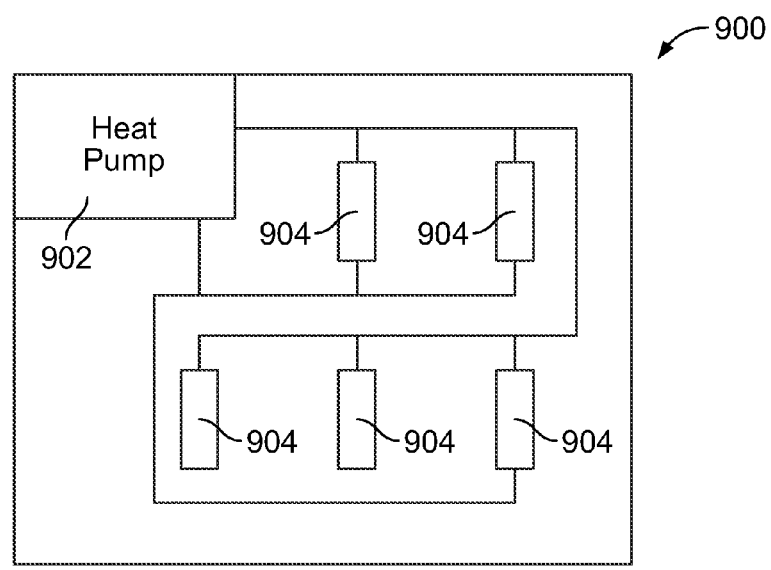
FIG. 9 illustrates a schematic of an enclosed structure, according to an embodiment of the present disclosure.

FIG. 9 illustrates a schematic of an enclosed structure 900, according to an embodiment of the present disclosure. Instead of having a single heat pump between enclosed structures, each enclosed structure 900 may include a separate and distinct heat pump 902 configured to condition desiccant. As such, the desiccant may be conditioned locally at or within each enclosed structure 900. Further, each enclosed structure 900 may include a plurality of LAMEEs 904. The LAMEEs 904 may form a grid that is secured to a ceiling of the enclosed structure 900. The enclosed structure 900 shown in FIG. 9 may be used with respect to any of the embodiments of the present disclosure.

Figure 10:
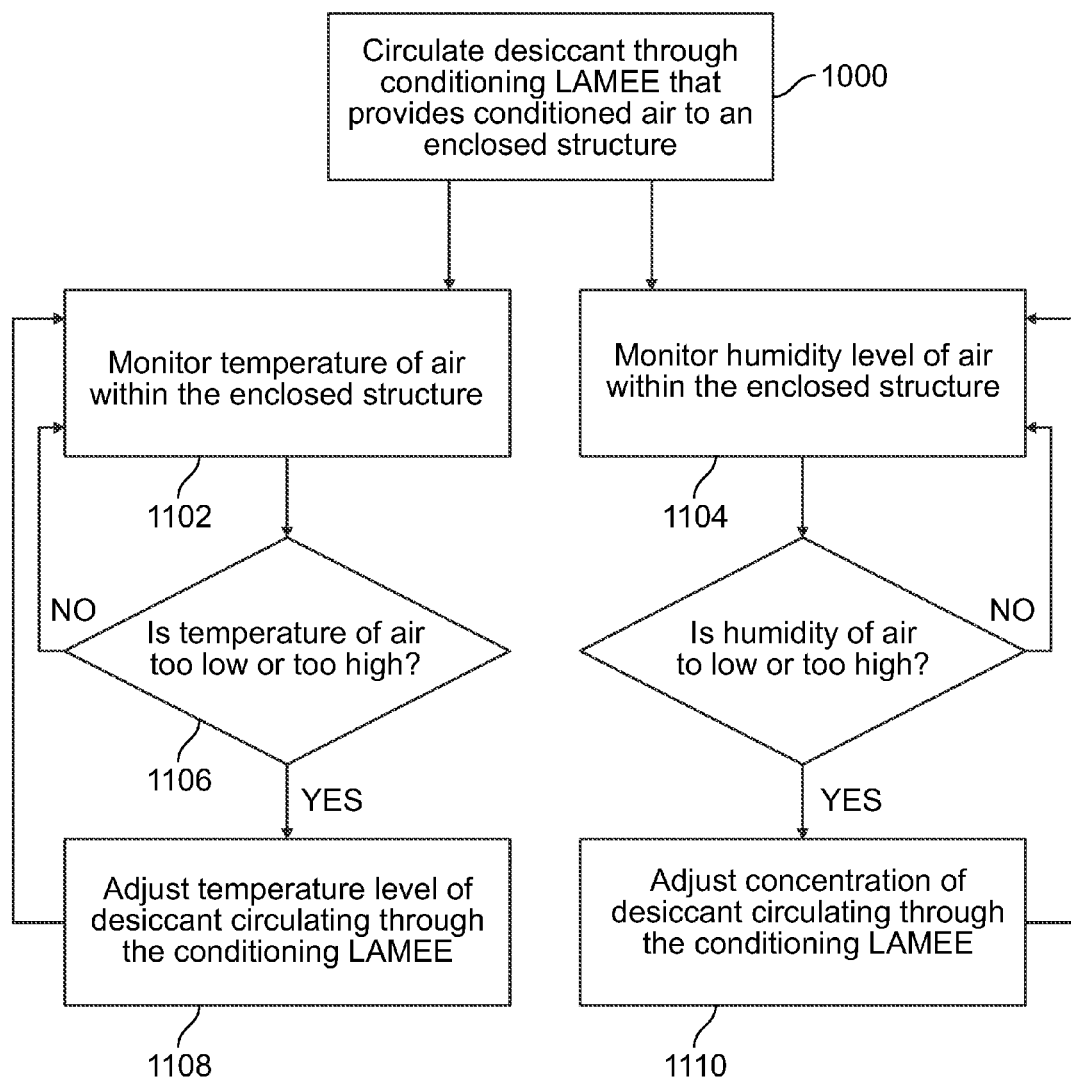
FIG. 10 illustrates a flow chart of a method of providing conditioned air to an enclosed structure, according to an embodiment of the present disclosure.

FIG. 10 illustrates a flow chart of a method of providing conditioned air to an enclosed structure, according to an embodiment of the present disclosure. At 1000, desiccant is circulated through a conditioning LAMEE, which provides conditioned air to the enclosed structure. At 1102, the temperature of air within the enclosed structure is monitored. At the same time, at 1104, the humidity level of air within the enclosed structure is monitored.

At 1106, it is determined whether the temperature of the air within the enclosed structure is too low or too high. If neither, the process returns to 1102. If, however, the temperature is lower or higher than a desired temperature, the process proceeds to 1108, in which the temperature level of the desiccant circulating through the conditioning LAMEE is adjusted, changed, or otherwise varied. The process then returns to 1102.

At the same time as 1106, it is determined whether the humidity level of the air within the enclosed structure is too low or too high. If neither, the process returns to 1104. If, however, the humidity level is lower or higher than a desired humidity level, the process proceeds to 1110, in which the concentration of the desiccant circulating through the conditioning LAMEE is adjusted, changed, or otherwise varied. The process then returns to 1104.

As noted, the temperature and humidity monitoring operations may occur simultaneously. Similarly, the temperature and humidity adjustments may also occur simultaneously. Alternatively, the temperature and humidity monitoring operations, as well as the adjustments to temperature and humidity, may occur at different times.

As explained above, embodiments of the present disclosure provide systems and methods of controlling characteristics and parameters of desiccant, for example, that is used to condition air that is to be supplied to one or more enclosed structures. The parameters and characteristics that may be varied include desiccant temperature, desiccant concentration, desiccant flow rates, desiccant recirculation, and the like. The temperature of the desiccant may be adjusted through operation of the regeneration module and the conditioning module as described above. In one example, the temperature of the desiccant within the conditioning module may be varied through energy exchange, and/or mixing the desiccant with concentrated or diluted desiccant. Further, the desiccant may be selectively diluted with water in order to adjust the concentration of the desiccant. The desiccant temperature may also be adjusted locally with a local heat exchanger, for example.

Further, the desiccant flow rate may be modulated through one or more pumps. For example, the flow rate of the desiccant through a conditioning LAMEE may be adjusted to modulate the effectiveness of the conditioning LAMEE.

Additionally, at least a portion of the desiccant may be recirculated or bypassed around the conditioning LAMEE to modulate transfer rate. The mixing of the recirculated desiccant and fresh desiccant may also be controlled.

Also, each conditioning module may include a desiccant storage tank configured to retain local reserves of desiccant. Desiccant from the reserves may be tapped to alter the concentration of desiccant flowing through the conditioning module.

The air flow rate through the conditioning LAMEE may also be varied, through the use of fans, for example, in order to modulate the effectiveness of the conditioning LAMEE. Further, air flow may be diverted or bypassed around the conditioning LAMEE.

Embodiments of the present disclosure provide a system and method of providing conditioned air to one or more enclosed structures. The systems and methods may independently heat or cool, and/or humidify or dehumidify air within an enclosed structure, zone by zone (for example, in different enclosed structures). The systems and methods utilize desiccant as an energy transfer medium. In contrast to an air-to-air system, the systems and methods of the present disclosure operate at lower cost and consume less energy. Instead of dehumidifying in a conventional manner (such as by cooling to dew point), embodiments of the present disclosure provide systems and methods that are able to dehumidify air at much higher temperatures, thereby saving energy. Further, the systems and methods of the present disclosure are able to humidify air without having to generate high temperature steam.

Certain embodiments of the present disclosure provide systems and methods having two or more conditioning modules, each of which may include a LAMEE. Each conditioning module may be in or proximate to a different zone, room, space, or the like. Each zone may be a different area of an enclosed structure, or a different enclosed structure. Further, each zone may or may not be connected to another zone.

One or more fluid connected may be between the multiple conditioning modules. The fluid connection(s) are configured to transfer one or both of sensible and latent energy between fluid streams. The liquid conveyed through the fluid connection(s) may be liquid desiccant, water, glycol, or the like.

Embodiments of the present disclosure, as described above, allow for independent control of temperature and humidity of each zone, separate and distinct from other zones.

Sensible conditioning may be achieved through distributed heat and cooling systems in each zone, or by a centralized heating and cooling zone that is operatively connected to multiple zones. Similarly, latent conditioning may be achieved through a distributed or centralized desiccant conditioning module(s).

Various fluid circuit connections may be used to connect the various components of the systems described above. Each connection may include different types of pipes, conduits, or the like, that are configured to convey various types of fluids, such as desiccant, water, glycol, or the like, at different temperatures, concentrations, etc. It is to be understood that the embodiments of the present disclosure are not limited to the specific configurations shown in the Figures.

Embodiments of the present disclosure also provide systems and methods that are configured to transfer sensible and latent energy between zones. As such, the overall energy demand of the systems may be reduced.

Various embodiments described herein provide a tangible and non-transitory (for example, not an electric signal) machine-readable medium or media having instructions recorded thereon for a processor or computer to operate a system to perform one or more embodiments of methods described herein. The medium or media may be any type of CD-ROM, DVD, floppy disk, hard disk, optical disk, flash RAM drive, or other type of computer-readable medium or a combination thereof.

The various embodiments and/or components, for example, the control sub-systems, or components and controllers therein, may also be implemented as part of one or more computers or processors. The computer or processor may include a computing device, an input device, a display unit and an interface, for example, for accessing the Internet. The computer or processor may include a microprocessor. The microprocessor may be connected to a communication bus. The computer or processor may also include a memory. The memory may include Random Access Memory (RAM) and Read Only Memory (ROM). The computer or processor may also include a storage device, which may be a hard disk drive or a removable storage drive such as a floppy disk drive, optical disk drive, and the like. The storage device may also be other similar means for loading computer programs or other instructions into the computer or processor.

As used herein, the term "computer," "control system," or "control sub-system" may include any processor-based or microprocessor-based system including systems using microcontrollers, reduced instruction set computers (RISC), application specific integrated circuits (ASICs), logic circuits, and any other circuit or processor capable of executing the functions described herein. The above examples are exemplary only, and are thus not intended to limit in any way the definition and/or meaning of the term "computer" or "module."

The computer or processor executes a set of instructions that are stored in one or more storage elements, in order to process input data. The storage elements may also store data or other information as desired or needed. The storage element may be in the form of an information source or a physical memory element within a processing machine.

The set of instructions may include various commands that instruct the computer or processor as a processing machine to perform specific operations such as the methods and processes of the various embodiments of the subject matter described herein. The set of instructions may be in the form of a software program. The software may be in various forms such as system software or application software. Further, the software may be in the form of a collection of separate programs, a program module within a larger program, or a portion of a program module. The software also may include modular programming in the form of object-oriented programming. The processing of input data by the processing machine may be in response to user commands, or in response to results of previous processing, or in response to a request made by another processing machine.

As used herein, the terms "software" and "firmware" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodi- This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal languages of the claims.

What is claimed is:

1. A system for providing conditioned air to an enclosed structure, the system comprising:
a conditioning module configured to provide conditioned air to the enclosed structure, wherein the conditioning module comprises a conditioning energy exchanger, and a desiccant mixing chamber that is configured to receive one or both of a concentrated desiccant or a diluted desiccant, wherein the conditioning module is configured to circulate desiccant through a desiccant circuit to condition air passing through the conditioning energy exchanger, wherein the conditioning module is configured to receive one or both of the concentrated desiccant or the diluted desiccant in order to vary temperature or concentration of the desiccant circulating through the desiccant circuit.

2. The system of claim 1, wherein the conditioning energy exchanger comprises a conditioning liquid-to-air membrane energy exchanger (LAMEE) configured to exchange sensible and latent energy between the desiccant and an air stream.

3. The system of claim 1, wherein the conditioning module includes:
a warm tap line connecting a heat exchanger of the conditioning module to a warm loop configured to circulate the concentrated desiccant therethrough; and
a cool tap line connecting the heat exchanger to a cool loop configured to circulate the diluted desiccant therethrough.

4. The system of claim 1, further comprising a desiccant regeneration module configured to regenerate the desiccant.

5. The system of claim 4, wherein the desiccant regeneration module comprises a regeneration LAMEE configured to regenerate the desiccant.

6. The system of claim 4, further comprising a heat source operatively connected to the desiccant regeneration module, wherein the heat source is configured to exchange sensible energy with the desiccant flowing through the desiccant regeneration module.

7. The system of claim 4, further comprising a heating module operatively connected to the desiccant regeneration module through a heat pump.

8. The system of claim 1, further comprising a control sub-system configured to control variation of the temperature and concentration of the desiccant.

9. The system of claim 1, further comprising a water source configured to dilute the desiccant.

10. The system of claim 1, further comprising a bypass duct configured to bypass airflow around the conditioning module.

11. The system of claim 1, further comprising additional conditioning modules, wherein each of the conditioning modules is within a separate and distinct zone.

12. The system of claim 11, further comprising a desiccant connection conduit connecting at least one of the conditioning modules in a first zone to at least another of the conditioning modules in a second zone that is separate and distinct from the first zone.

13. The system of claim 1, further comprising a concentrated desiccant storage tank connected to a warm loop, wherein the concentrated desiccant storage tank is configured to provide additional concentrated desiccant to the warm loop.

14. A method of providing conditioned air to an enclosed structure, the method comprising:
conditioning air within the enclosed structure with a conditioning module, wherein the conditioning operation includes exchanging sensible and latent energy between the air and desiccant that circulates through the conditioning module;
circulating concentrated desiccant through a warm loop that connects to the conditioning module;
circulating diluted desiccant through a cool loop that connects to the conditioning module; and
controlling the temperature and concentration of the desiccant through one or both of the circulated concentrated desiccant or the circulating diluted desiccant operations.

15. The method of claim 14, further comprising mixing one or both of the concentrated desiccant from the warm loop or the diluted desiccant from the cool loop with the desiccant in a mixing chamber of the conditioning module to control the concentration of, the desiccant.

16. The method of claim 14, further comprising exchanging sensible energy between the warm and cool loops through a heat pump connected therebetween.

17. The method of claim 14, further comprising providing additional concentrated desiccant to the warm loop through a concentrated desiccant storage tank.

18. The method of claim 14, further comprising exchanging sensible energy between the desiccant within the conditioning module with one or both of the concentrated desiccant from the warm loop or the cool diluted desiccant from the cool loop to control the temperature of the desiccant.

19. The method of claim 14, further comprising regenerating the warm concentrated desiccant with a desiccant regeneration module.

20. The method of claim 14, further comprising diluting the desiccant with water from a water source.

* * * * *